US012703434B2

(12) United States Patent
Pard et al.

(10) Patent No.: US 12,703,434 B2
(45) Date of Patent: Aug. 11, 2026

(54) VEHICLE HAVING SUPPORT HOLDERS BELOW A CARGO BED

(71) Applicant: BOMBARDIER RECREATIONAL PRODUCTS INC., Valcourt (CA)

(72) Inventors: Jean-Sebastien Pard, Tingwick (CA); Guillaume Auger, Danville (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 378 days.

(21) Appl. No.: 18/476,358

(22) Filed: Sep. 28, 2023

(65) Prior Publication Data

US 2024/0109604 A1 Apr. 4, 2024

Related U.S. Application Data

(60) Provisional application No. 63/412,197, filed on Sep. 30, 2022.

(51) Int. Cl.
*B62D 33/027* (2006.01)

(52) U.S. Cl.
CPC .................................. *B62D 33/027* (2013.01)

(58) Field of Classification Search
CPC ........ B62D 33/027; B62D 33/033; B60P 1/64
See application file for complete search history.

(56) References Cited

U.S. PATENT DOCUMENTS 6,659,524 B1 * 12/2003 Carlson .................. B60P 1/003 414/522
6,695,566 B2 * 2/2004 Rodriguez Navio .. B62D 33/02 180/22
7,222,905 B2 * 5/2007 Jaeck ........................ B60P 3/14 296/10
7,845,712 B2 * 12/2010 Gordon .................... B60J 10/80 296/190.11
9,481,316 B2 * 11/2016 Faruque .................... B60R 9/06
10,358,059 B2 * 7/2019 Keziah ................. B60N 2/3031
11,059,423 B1 * 7/2021 Weaver ................ B62D 33/027
11,530,001 B2 * 12/2022 Williams ........... B62D 33/0273
2003/0141733 A1 * 7/2003 Burg ....................... B60R 5/041 296/26.09
2006/0108821 A1 * 5/2006 Hawkins .............. B62D 33/027 296/57.1
2007/0210599 A1 * 9/2007 Arnold .................... B60P 1/003 296/26.09
2016/0214657 A1 * 7/2016 Topolovec ........... B62D 33/037

* cited by examiner

*Primary Examiner* — Aaron L Lembo
(74) *Attorney, Agent, or Firm* — BCF LLP

(57) ABSTRACT

A vehicle has a cargo bed and first and second support holders disposed below the cargo bed. Each of the first and second support holders defines at least in part an opening for inserting first and second elongate supports therethrough respectively. The first and second support holders are oriented such that the first and second elongate supports are inserted from a common side of the cargo bed into the openings of the first and second support holders. The opening of each of the first support holder and of each of the second support holder is shaped to match a cross-sectional profile of a corresponding one of the first and second elongate supports such that, in use, the first support holder and the second support holder at least partially surround part of the first and second elongate supports respectively to hold the first and second elongate supports in place.

20 Claims, 31 Drawing Sheets

VEHICLE HAVING SUPPORT HOLDERS BELOW A CARGO BED

CROSS-REFERENCE

The present application claims priority to U.S. Provisional Patent Application No. 63/412,197, filed Sep. 30, 2022, the entirety of which is incorporated herein by reference.

FIELD OF TECHNOLOGY

The present technology relates to vehicles having cargo beds.

BACKGROUND

Some vehicles, such as off-road vehicles (e.g., side-by-side vehicles (SSVs)), have a cargo bed to allow the vehicle to easily store cargo therein. Notably, the size of the cargo bed typically facilitates transporting bulky items, including material and tools amongst others.

However, the size of the cargo bed may not be sufficient to allow for the transport of items that are longer than a length of the cargo bed. Some vehicles have been designed to address this problem by providing a pass-through opening in the cargo bed that communicates the cargo bed with a cabin of the vehicle thereby affording additional space for long items to be accommodated in the cargo bed. However, this may not be sufficient for some lengthier items and/or if the length of the cargo bed is relatively small.

Moreover, vehicles with cargo beds are often used for utility purposes and could be better adapted to the usage scenarios in such cases.

Thus there is a desire for a vehicle having a cargo bed that addresses at least in part some of these drawbacks.

SUMMARY

It is an object of the present technology to ameliorate at least some of the inconveniences present in the prior art.

According to one aspect of the present technology, there is provided a vehicle comprising: a frame; a plurality of ground-engaging members connected to the frame; a motor supported by the frame, the motor being operatively connected to at least one of the ground-engaging members; a cargo bed connected to the frame; and at least one first support holder and at least one second support holder disposed below the cargo bed, each of the at least one first support holder and each of the at least one second support holder defining at least in part an opening for inserting a first elongate support and a second elongate support therethrough respectively, the at least one first support holder and the at least one second support holder being oriented such that the first and second elongate supports are inserted from a common side of the cargo bed into the openings of the at least one first support holder and the at least one second support holder, the opening of each of the at least one first support holder and of each of the at least one second support holder being shaped to match a cross-sectional profile of a corresponding one of the first and second elongate supports such that, in use, the at least one first support holder and the at least one second support holder at least partially surround part of the first and second elongate supports respectively to hold the first and second elongate supports in place.

In some embodiments, for each support holder of the at least one first support holder and the at least one second support holder, the opening defined at least in part by the support holder is generally rectangular.

In some embodiments, for each opening: one of a width and a height of the opening is approximately 1.5 inches; another one of the width and the height of the opening is approximately 3.5 inches; the width is measured laterally; and the height is measured vertically.

In some embodiments, each of the at least one first support holder and each of the at least one second support holder is a metallic bracket.

In some embodiments, the at least one first support holder is at least one left support holder; the at least one second support holder is at least one right support holder laterally spaced from the at least one left support holder; and the at least one left support holder and the at least one right support holder are oriented such that, in use, the first and second elongate supports are inserted longitudinally from a rear side of the cargo bed into the openings of the at least one first support holder and the at least one second support holder.

In some embodiments, the cargo bed comprises a tailgate having an outer surface and an inner surface opposite the outer surface, the tailgate being movable from an open position to a closed position; the outer surface defines a left recess and a right recess, the left recess being laterally aligned with the at least one left support holder, the right recess being laterally aligned with the at least one right support holder; and the left and right recesses are configured to respectively receive at least in part the first and second elongate supports therein in the open position of the tailgate.

In some embodiments, a ratio of a distance between the at least one first support holder and the at least one second support holder over a width of the cargo bed is between 0.7 and 1 inclusively.

In some embodiments, the frame is a vehicle frame; the cargo bed comprises a cargo bed frame and a body connected to the cargo bed frame, the body comprising a front wall, a left wall and a right wall defining in part an internal space of the cargo bed; and the at least one first support holder and the at least one second support holder are fastened to at least one of the vehicle frame, the cargo bed frame, and the body of the cargo bed.

In some embodiments, the plurality of ground-engaging members includes left ground-engaging members and right ground-engaging members; and the at least one first support holder and the at least one second support holder are disposed laterally between the left and right ground-engaging members.

In some embodiments, the at least one first support holder and the at least one second support holder are disposed opposite sides of a longitudinal centerplane of the vehicle.

In some embodiments, the at least one left support holder includes a front left support holder and a rear left support holder longitudinally spaced from each other and laterally aligned with each other, the front left support holder and the rear left support holder being configured to receive the first elongate support; and the at least one right support holder includes a front right support holder and a rear right support holder longitudinally spaced from each other and laterally aligned with each other, the front right support holder and the rear right support holder being configured to receive the second elongate support.

In some embodiments, a ratio of a distance between the front left support holder and the rear left support holder or between the front right support holder and the rear right support holder over a length of the cargo bed measured longitudinally is between 0.3 and 0.5 inclusively.

In some embodiments, each of the at least one first support holder and each of the at least one second support holder has a length between approximately 2 and 4 inches inclusively.

In some embodiments, the at least one first support holder and the at least one second support holder are oriented such that the first and second elongate supports are inserted generally parallel to each other into the openings of the at least one first support holder and the at least one second support holder.

According to another aspect of the present technology, there is provided a method for installing a workbench on a vehicle having a cargo bed, the method comprising: inserting a first elongate support through a first opening defined at least in part by a first support holder connected to the cargo bed and disposed below the cargo bed; inserting a second elongate support, parallel to the first elongate support, through a second opening defined at least in part by a second support holder connected to the cargo bed and disposed below the cargo bed, the first elongate support and the second elongate support being sized to extend past the cargo bed; and installing a work surface on a portion of the first elongate support and the second elongate support that extends past the cargo bed.

In some embodiments, the first support holder is a left support holder; the second support holder is a right support holder; the cargo bed comprises a tailgate that is movable between an open position and a closed position, the tailgate having an outer surface and an inner surface opposite the outer surface; the outer surface defines a left recess and a right recess laterally aligned with the left and right support holders respectively; and the method further comprises: opening the tailgate to receive part of the first elongate support in the left recess of the tailgate and to receive part of the second elongate support in the right recess of the tailgate.

For purposes of this application, terms related to spatial orientation such as forwardly, rearward, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned objects and/or aspects, but do not necessarily have all of them. It should be understood that some aspects of the present technology that have resulted from attempting to attain the above-mentioned object may not satisfy these objects and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
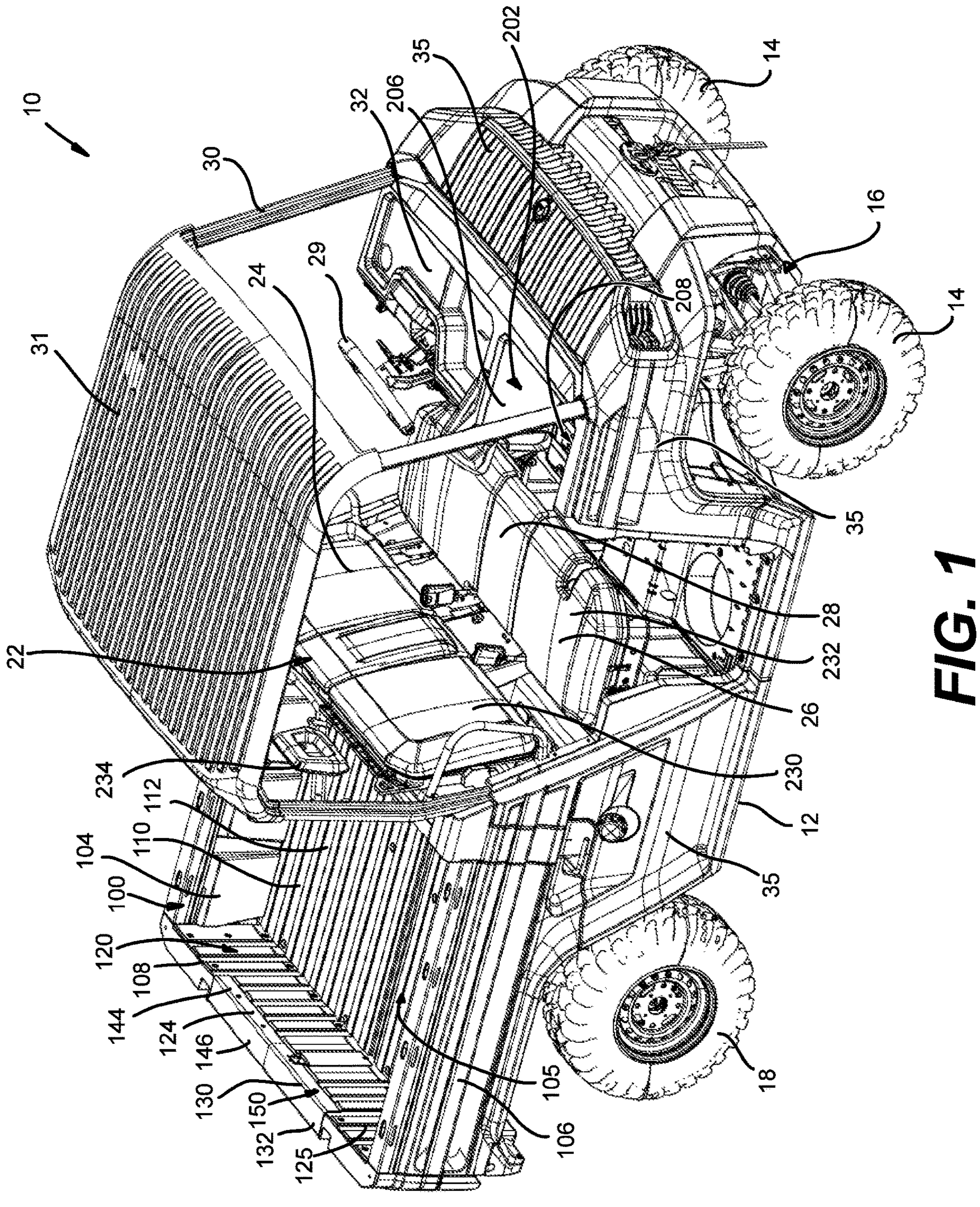
FIG. 1 is a perspective view taken from a top, front, right side of an off-road vehicle according to an embodiment of the present technology.

The present technology will be described with respect to a four-wheel, off-road vehicle 10 having two side-by-side seats and a steering wheel (i.e. a side-by-side vehicle (SSV)). However, it is contemplated that at least some aspects of the present technology may apply to other types of vehicles having cargo beds such as, but not limited to, off-road vehicles having a straddle seat and a handlebar (i.e. an all-terrain vehicle (ATV)), off-road vehicles having a single bucket-type seat, off-road vehicles with more than four wheels, off-road vehicles having ground-engaging members other than wheels, and other types of vehicles.

The general features of the off-road vehicle 10 will now be described herein with respect to FIG. 1. The vehicle 40 has a frame 12 which defines a cockpit area 22 inside which a driver seat 24, a passenger seat 26 and a passenger seat 28 are provided side-by-side. The passenger seat 28 is provided between the seats 24 and 26. In this embodiment, the driver seat 24 is on the left side of the vehicle 10 and the passenger seat 26 is on the right side of the vehicle 10, but it is contemplated that it could be the opposite. It is contemplated that one or both of the passenger seats 26, 28 could be omitted. It is also contemplated that the individual driver and passenger seats 24, 26, 28 could be replaced by a bench seat spanning a majority of the width of the cockpit area 22 which would define the driver and the passenger seats. The vehicle 10 also includes a roll cage 30 connected to the frame 12 and extending at least partially over the driver seat 24 and the passenger seats 26, 28. In this embodiment, a roof 31 is connected to the roll cage 30 to at least partially overlie the cockpit area 22.

The vehicle 10 includes left and right front wheels 14 connected to the frame 12 by a pair of front suspension assemblies 16. Left and right rear wheels 18 are connected to the frame 12 by a pair of rear suspension assemblies 20. The vehicle 10 has a brake system (not shown) including four brake assemblies, each one being operatively connected to a respective one of the wheels 14, 18. Each brake assembly includes a brake disc and a caliper disposed around its corresponding brake disc. Each caliper is connected to a corresponding brake line. Each caliper includes a pair of brake pads positioned on opposite sides of its respective brake disc. The brake assemblies are actuated by actuating the calipers by application of a fluid pressure in the brake lines, thereby causing the brake pads to apply pressure on their respective brake discs.

Figure 3:
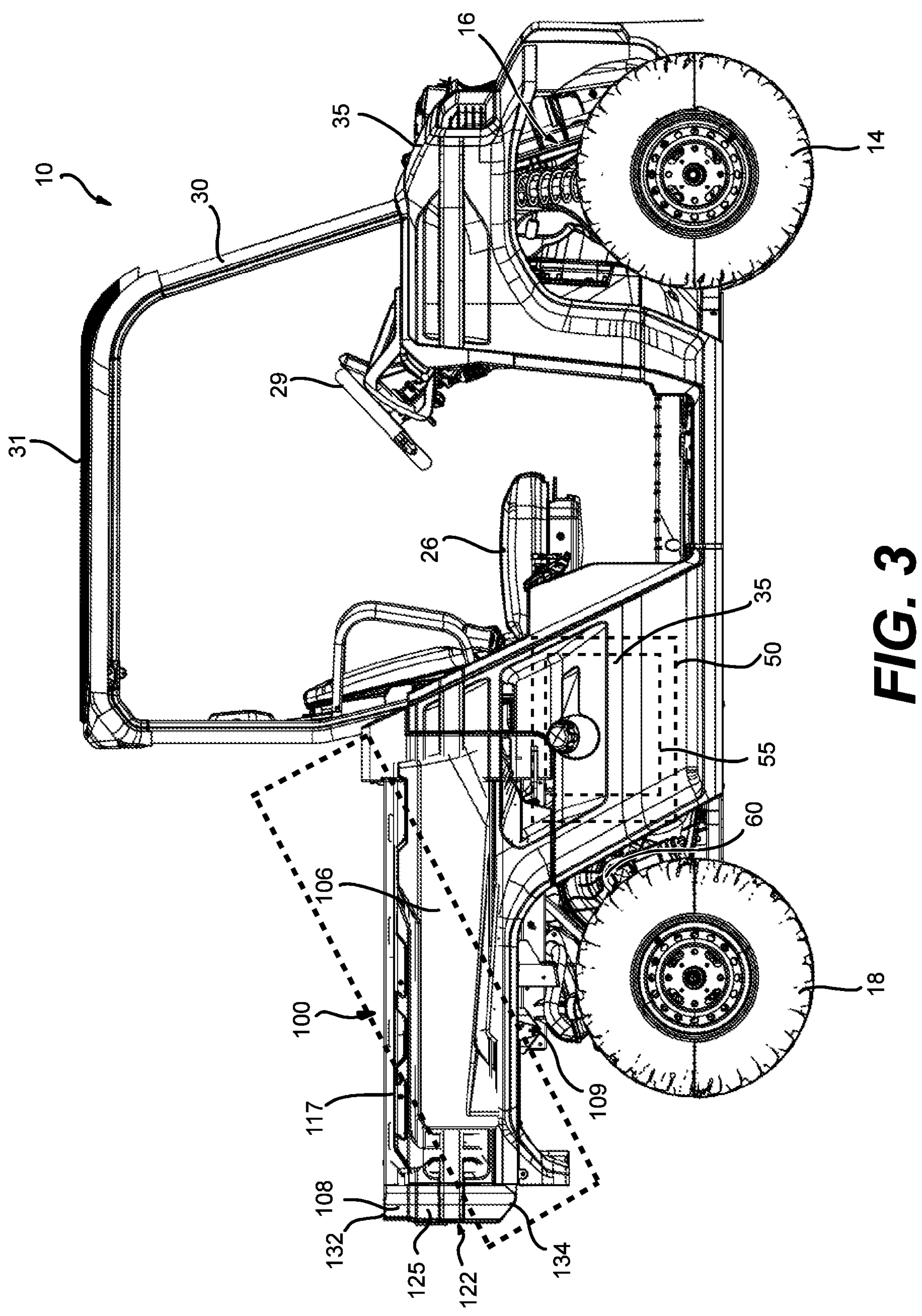
FIG. 3 is a right side elevation view of the vehicle of FIG. 1.

As shown in FIGS. 1 and 3, the vehicle 10 has a steering wheel 29 operatively connected to the front wheels 14 for controlling a steering angle of the front wheels 14. The driver operates the steering wheel 29 from the driver seat 24. The steering wheel 29 is disposed in front of the driver seat 24. A steering position sensor (not shown) is operatively connected to the steering wheel 29, via a steering assembly, for determining a steering angle of the front wheels 14. The vehicle 10 also includes a dashboard 32 disposed in front of the driver seat 24, the passenger seat 26 and the passenger seat 28. The dashboard 32 may include multiple indicators such as a fuel gauge, a speedometer, a gear shift indicator, and/or other types of indicators for presenting vehicle operation parameters or other types of information to the driver. An accelerator (not shown) in the form of a throttle pedal is disposed over the floor of the cockpit area 22 below the steering wheel 29 and in front of the driver seat 24. An accelerator position sensor (not shown) is operatively connected to the accelerator to sense movement thereof caused by the driver in operation.

A plurality of body panels 35 are provided on the vehicle 10 to conceal the internal components of the vehicle 10 and to enclose the cabin of the vehicle 10.

A powertrain of the vehicle 10 includes a motor 50 (schematically shown in FIG. 3) that is connected to the frame 12 in a rear portion of the vehicle 10. In this embodiment, the motor 50 is an internal combustion engine. The engine 50 has a crankcase, a cylinder block defining two cylinders connected on top of the crankcase and a cylinder head connected on top of the cylinder block. A crankshaft (not shown) is disposed in the crankcase and driven by the motion of the engine's pistons disposed in the cylinders. An engine output shaft extends outwardly from the crankcase on a right side thereof and is connected to the crankshaft to rotate therewith. The engine output shaft operatively connects the crankshaft to the front and rear wheels 14, 18 for driving thereof. In other embodiments, only the front wheels 14 or only the rear wheels 18 may be driven by the crankshaft.

As shown schematically in FIG. 3, a fuel tank 55 of the vehicle 10 is fluidly connected to the engine 50 to provide fuel thereto. In this embodiment, the fuel tank 55 is positioned to the right of the engine 50.

The vehicle 10 includes an engine control module (ECM) for monitoring and controlling various operations of the engine 50. The ECM is communicatively connected to the pedal position sensor for receiving signals for controlling a throttle valve (not shown) of the engine 50. The engine 50 also includes a throttle position sensor (not shown) operatively connected to the throttle valve and communicatively connected to the ECM for monitoring the position of the throttle valve.

Figure 28:
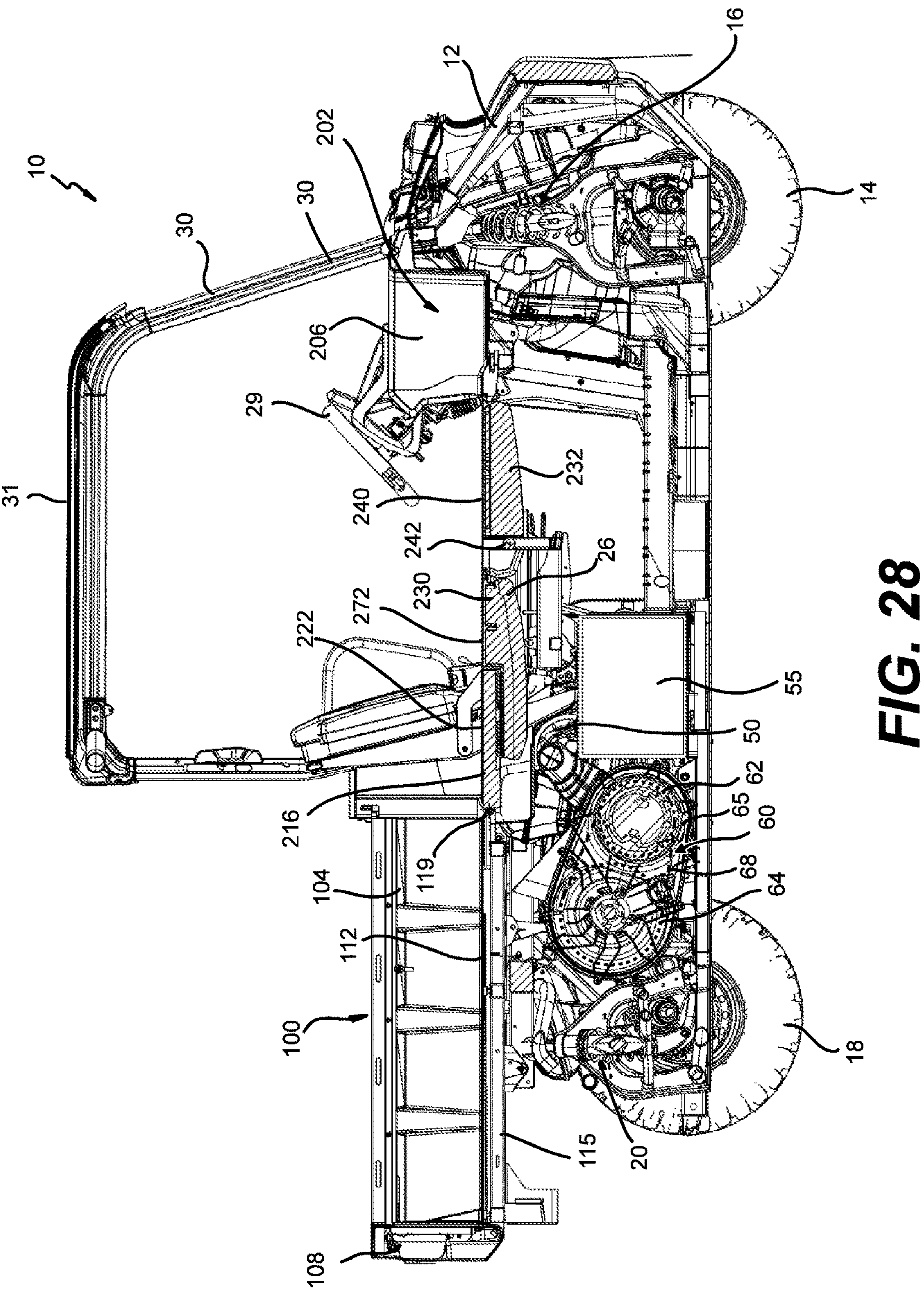
FIG. 28 is a cross-sectional view of the vehicle of FIG. 1 taken along a plane parallel to a longitudinal centerplane of the vehicle, showing the passenger seat in the stowed position and the movable portion in the lowered position.

In this embodiment, as shown in FIG. 28, the engine 50 is disposed behind the cockpit area 22 and below a cargo bed 100 of the vehicle 10.

With reference to FIG. 28, the engine 50 is connected to a continuously variable transmission (CVT) 60 disposed on a right side of the engine 50. The CVT 60 includes a drive pulley 62 mounted to the engine output shaft and thereby operatively connected to the crankshaft of the engine 50, a driven pulley 64 mounted to a countershaft (not shown) for rotation therewith, and a transmission belt 68 disposed around both pulleys 62, 64 to transmit torque from the drive pulley 62 to the driven pulley 64. A CVT housing 65 encloses the drive pulley 62, the driven pulley 64 and the transmission belt 68 therein. Each of the pulleys 62, 64 includes a movable sheave that can move axially relative to a fixed sheave to modify an effective diameter of the corresponding pulley 62, 64. The drive pulley 62 is a centrifugal pulley in that the sheaves thereof move in response to a centrifugal force applied thereon. The effective diameters of the pulleys 62, 64 are in inverse relationship. In the illustrated embodiment, the CVT 60 is a purely mechanical CVT 60, in which the diameter of the drive pulley 62 increases with increasing rotational speed of the drive pulley 62 (i.e., with increasing engine speed). The effective diameter of the driven pulley 64 therefore decreases when the torque required at the countershaft 66 increases. The CVT 60 may thus be referred to as an "unassisted" CVT in that a gear ratio of the CVT 60 (i.e., an effective diameter of the driven pulley 64 over the effective diameter of the drive pulley 62) is automatically mechanically adjusted in accordance with the speed of the engine 50 and the torque requirement at the countershaft. It is contemplated that, in other embodiments, the CVT 60 could be an assisted CVT such as a hydraulic CVT.

Figure 2:
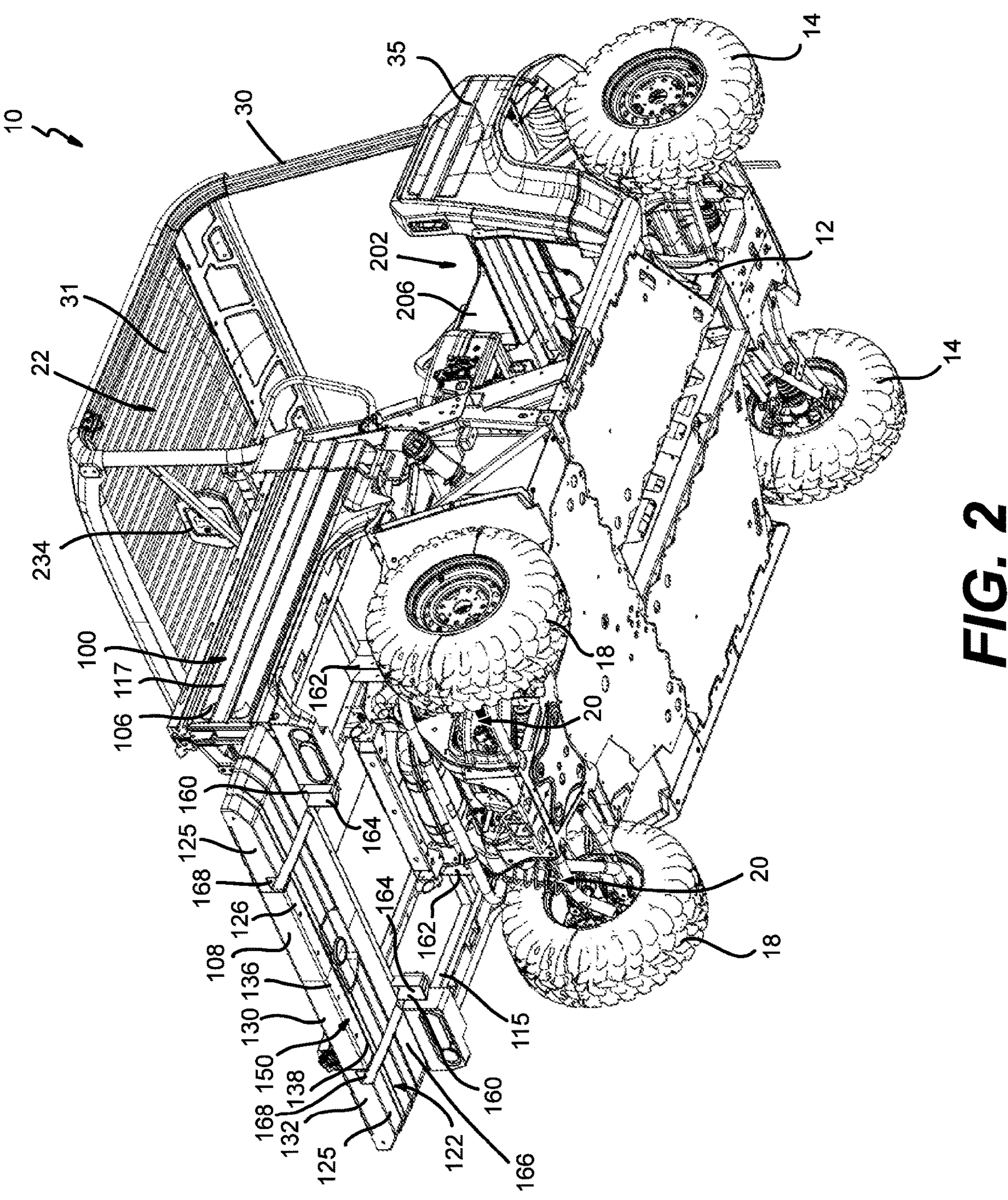
FIG. 2 is a perspective view taken from a bottom, rear, right side of the vehicle of FIG. 1, with a tailgate of a cargo bed of the vehicle shown in an open position.

Turning now to the cargo bed 100 of the vehicle 10, as shown in FIGS. 1 to 3, the cargo bed 100 disposed behind the cockpit area 22. The cargo bed 100 is configured to store cargo therein, such as materials, tools, supplies, etc. The cargo bed 100 is connected to the frame 12 and has a cargo bed frame 115 (FIG. 2) and a body 117. The cargo bed frame 115 is connected to the frame 12 of the vehicle 10 (e.g., fastened thereto via a hinge). The body 117 of the cargo bed 100 includes a front wall 102, left and right walls 104, 106 and a cargo bed floor 110 which has a cargo bed supporting surface 112 on which the cargo stored in the cargo bed 100 can be supported. As shown in FIG. 3, in this embodiment, the cargo bed 100 is pivotable about a pivot 109 between a lowered position (illustrated in FIGS. 1 to 3) and a raised position (the raised position being shown in dashed lines in FIG. 3). As can be seen, the cargo bed 100 is pivotable rearward about the pivot 109 such that the front wall 102 is disposed vertically higher in the raised position than in the lowered position. It is contemplated that, in other embodiments, the cargo bed frame 115 could be welded or otherwise fixedly fastened to the frame 12.

A tailgate 108 is pivotably connected to the body 117 and extends laterally at a rear end of the cargo bed 100. The tailgate 108 has an upper end 132 and a lower end 134 defining a height of the tailgate 108 therebetween. The tailgate 108 is movable between a closed position (shown in FIG. 1) and an open position (shown in FIG. 2). The tailgate 108 has an inner side 120 and an outer side 122 opposite the inner side 120. In the closed position of the tailgate 108, the inner side 120 faces the front wall 102 and the upper end 132 of the tailgate 108 is disposed vertically higher than the lower end 134. Moreover, in the closed position of the tailgate 108, the inner side 120 of the tailgate 108 together with the front wall 102 and left and right walls 104, 106 define an internal space 105 of the cargo bed 100 in which the cargo can be stored within the cargo bed 100. In the open position of the tailgate 108, the inner side 120 of the tailgate 108 faces upwardly while the outer side 122 faces downwardly. As such, in the open position, a tailgate supporting surface 175 on the inner side 120 of the tailgate 108 faces upwardly and allows items to be supported thereon (in cases in which the user needs to store lengthier items for example). The tailgate 108 can be placed in the open position to facilitate loading and unloading the cargo bed 100 or, in some cases, to transport lengthy items, whereas the tailgate 108 is placed in the closed position to secure the contents of the cargo bed 100 therein or simply to prevent the tailgate 108 from moving during movement of the vehicle 10.

Figure 4:
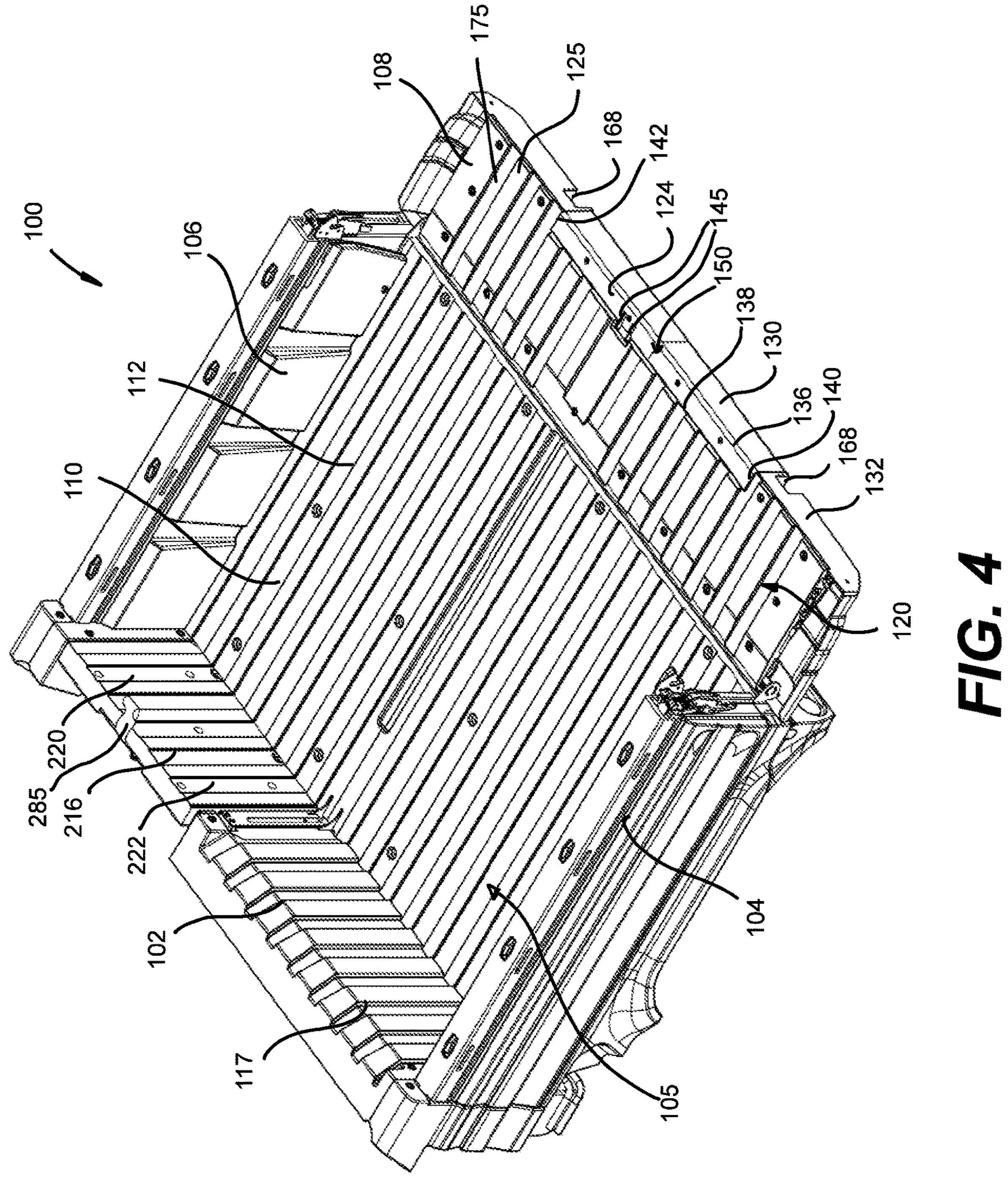
FIG. 4 is a perspective view taken from a top, rear, left side of the cargo bed of the vehicle of FIG. 1, with the tailgate of the cargo bed shown in the open position.
Figure 6:
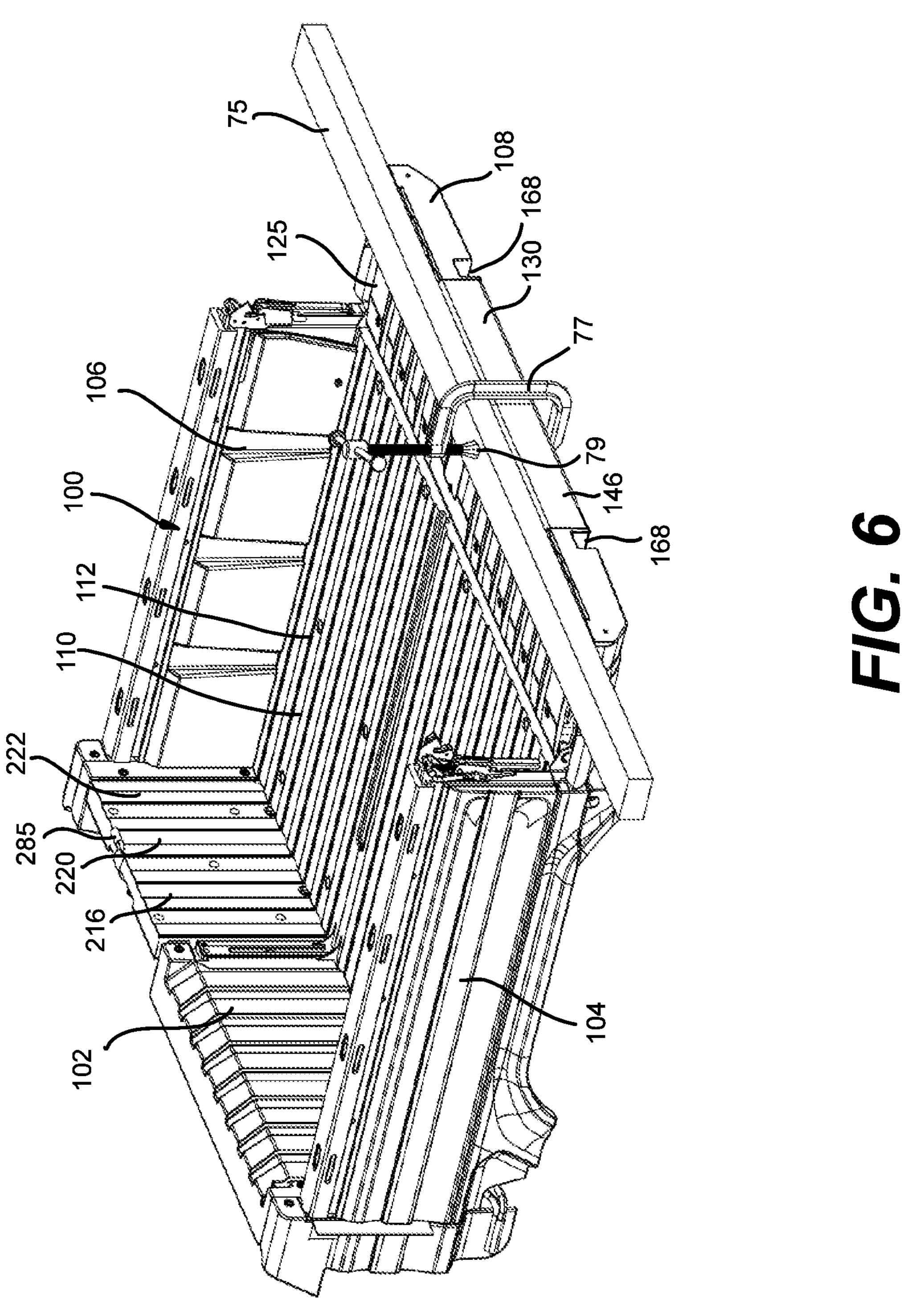
FIG. 6 is a perspective view taken from a top, rear, left side of the cargo bed of the vehicle of FIG. 1 showing an item clamped to a clamping zone of the tailgate.

In this embodiment, the tailgate 108 is configured to allow clamping of an item thereto, as illustrated in FIG. 6, which can be useful in cases where a user does not have immediate access to a work bench. In particular, with reference to FIGS. 1, 2 and 4, the tailgate 108 has a clamping zone 150 that is particularly useful when the tailgate 108 is in the open position. The clamping zone 150 is defined by an inner flat surface 124 and an outer flat surface 126 which are disposed on the inner side 120 and the outer side 122 of the tailgate 108 respectively. The inner and outer flat surfaces 124, 126 are parallel to each other to facilitate the engagement of a clamp thereto. As such, in the closed position of the tailgate 108, the inner and outer flat surfaces 124, 126 extend generally vertically and the outer flat surface 126 is disposed behind the inner flat surface 124. However, in the open position of the tailgate 108, the inner and outer flat surfaces 124, 126 extend generally horizontally, with the outer flat surface 126 being disposed below the inner flat surface 124. Thus, in the open position of the tailgate 108, the user can easily clamp an item to the clamping zone 150 defined by the inner and outer flat surfaces 124, 126.

Furthermore, the inner and outer flat surfaces 124, 126 are made of a material that is more rigid than a material of a remainder of the tailgate 108. Therefore, the inner and outer flat surfaces 124, 126 are designed to better withstand wear than the remainder of the tailgate 108, namely the other surfaces on the inner and outer sides 120, 122 of the tailgate 108 which are typically made of a plastic material. For example, in this embodiment, the inner and outer flat surfaces 124, 126 are made of a metallic material (e.g., stainless steel).

In this embodiment, the inner and outer flat surfaces 124, 126 extend from the upper end 132 of the tailgate 108. More specifically, each of the inner and outer flat surfaces 124, 126 extends from a first end 136 to a second end 138 which may be referred to as an upper end 136 and a lower end 138 respectively given their positions in the closed position of the tailgate 108. The upper ends 136 of the inner and outer flat surfaces 124, 126 correspond to the upper end 132 of the tailgate 108. In the closed position of the tailgate 108, the upper end 136 and the lower end 138 are vertically spaced apart, whereas in the open position of the tailgate 108, the upper end 136 and the lower end 138 are longitudinally spaced apart. A distance between the upper and lower ends 136, 138 is at least 4 cm.

In this embodiment, the inner and outer flat surfaces 124, 126 are generally centered with respect to a longitudinal centerplane of the vehicle 10. More specifically, respective left and right lateral ends 140, 142 of each of the inner and outer flat surfaces 124, 126 are equally spaced from the longitudinal centerplane of the vehicle 10. Each of the inner and outer flat surfaces 124, 126 is continuous from the left lateral end 140 to the right lateral end 142 thereof and defines a respective width therebetween. The width of each of the inner flat surface 124 and the outer flat surface 126 is at least 40 cm. In this example, the inner and outer flat surfaces 124, 126 extend along a majority of a width of the tailgate 108.

In this embodiment, the inner flat surface 124 defines two parallel notches 145 that extend vertically in the closed position of the tailgate 108. The notches 145 are configured to receive part of an optional removable wall 340 (FIG. 31) of the cargo bed 100. In particular, two hooks 342 of the removable wall 340 are received by the notches 145 in the closed position of the tailgate 108 to secure the removable wall 340 in place. The notches 145 may be omitted in other embodiments.

Figure 5:
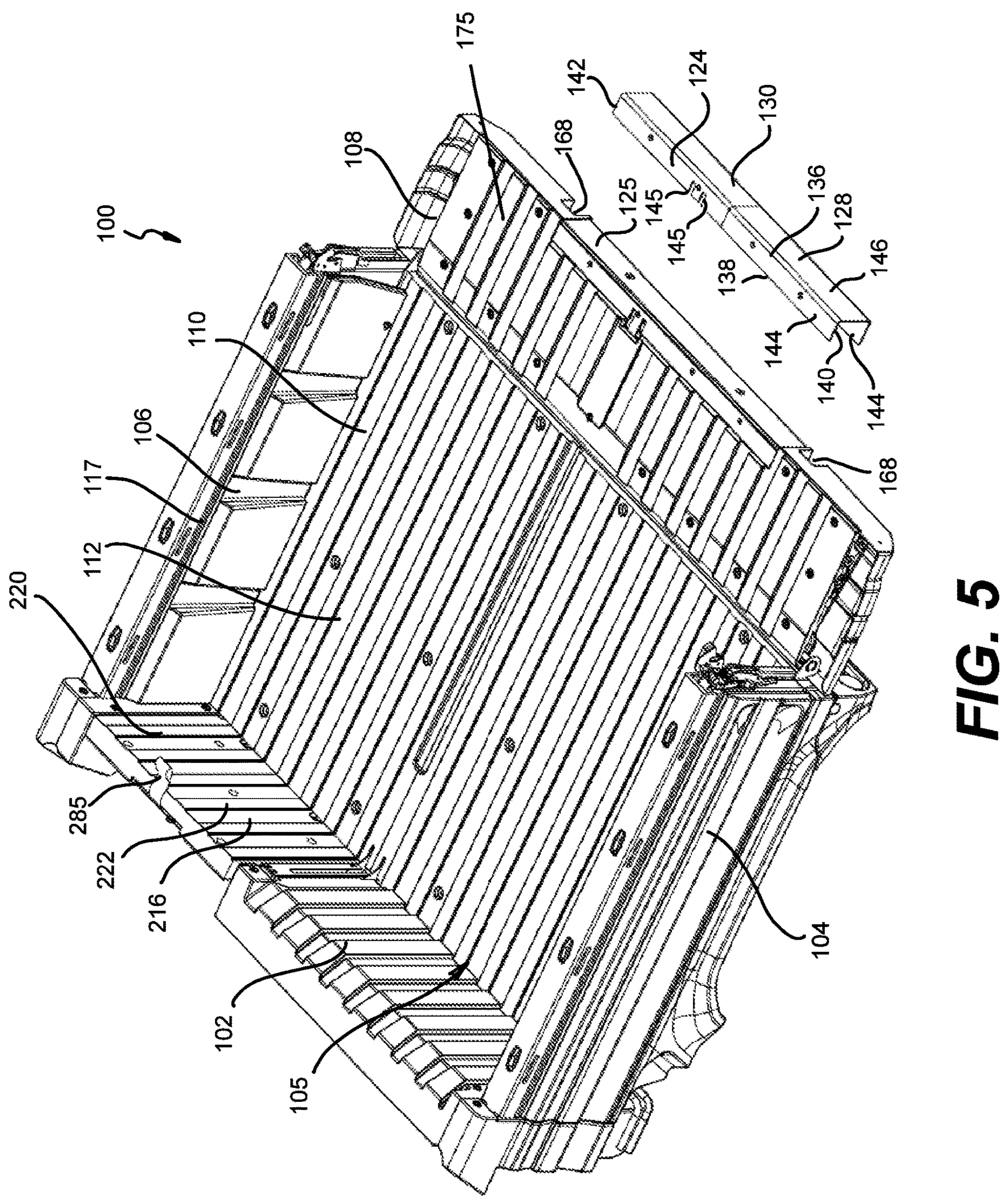
FIG. 5 is a perspective view taken from a top, rear, left side of the cargo bed of the vehicle of FIG. 1 showing the tailgate in a partially exploded configuration.

As best shown in FIG. 5, in this embodiment, the inner and outer flat surfaces 124, 126 are defined by a clamping attachment 130 that is removably inserted over a body 125 of the tailgate 108. In this example, the clamping attachment 130 is a channel having two parallel walls 144 and a central wall 146 extending between the parallel walls 144. Each of the parallel walls 144 defines a respective one of the inner and outer flat surfaces 124, 126. As can be seen, the clamping attachment 130 is elongated in a lateral direction of the vehicle 10. In this example, the clamping attachment 130 is made of a metallic material (e.g., stainless steel). In particular, the clamping attachment 130 is a bent sheet metal component.

It is contemplated that, in other embodiments, the inner and outer flat surfaces 124, 126 may not be part of a clamping attachment. For example, in other embodiments, the inner and outer flat surfaces 124, 126 may be separate plate members that are connected to the body 125 of the tailgate 108 on the inner and outer side 120, 122 thereof respectively.

As will be appreciated from the above, the inner and outer flat surfaces 124, 126 allow a user to securely clamp an item to the tailgate 108. For instance, in one example, as shown in FIG. 6, a beam 75 (e.g., a wooden beam) is clamped to the tailgate 108. Notably, in the open position of the tailgate 108, the beam 75 is placed on the inner flat surface 124 (in this example, the beam 75 is placed to extend laterally) and a clamp 77 (e.g., a C-clamp) is positioned such that a jaw 79 thereof engages the beam 75 while another jaw (not shown) of the clamp 77 engages the outer flat surface 126. Once the clamp 77 is tightened, the beam 75 is securely fixed onto the tailgate 108. For example, this may be useful to quickly fix the beam 75 in order to cut off a part of the beam. Moreover, as the inner and outer flat surfaces 124, 126 are the only parts of the tailgate 108 that are engaged by the beam 75 and/or the clamp 77, the tailgate 108 is not exposed to any significant damage due to the rigid material of the inner and outer flat surfaces 124, 126.

Figure 7:
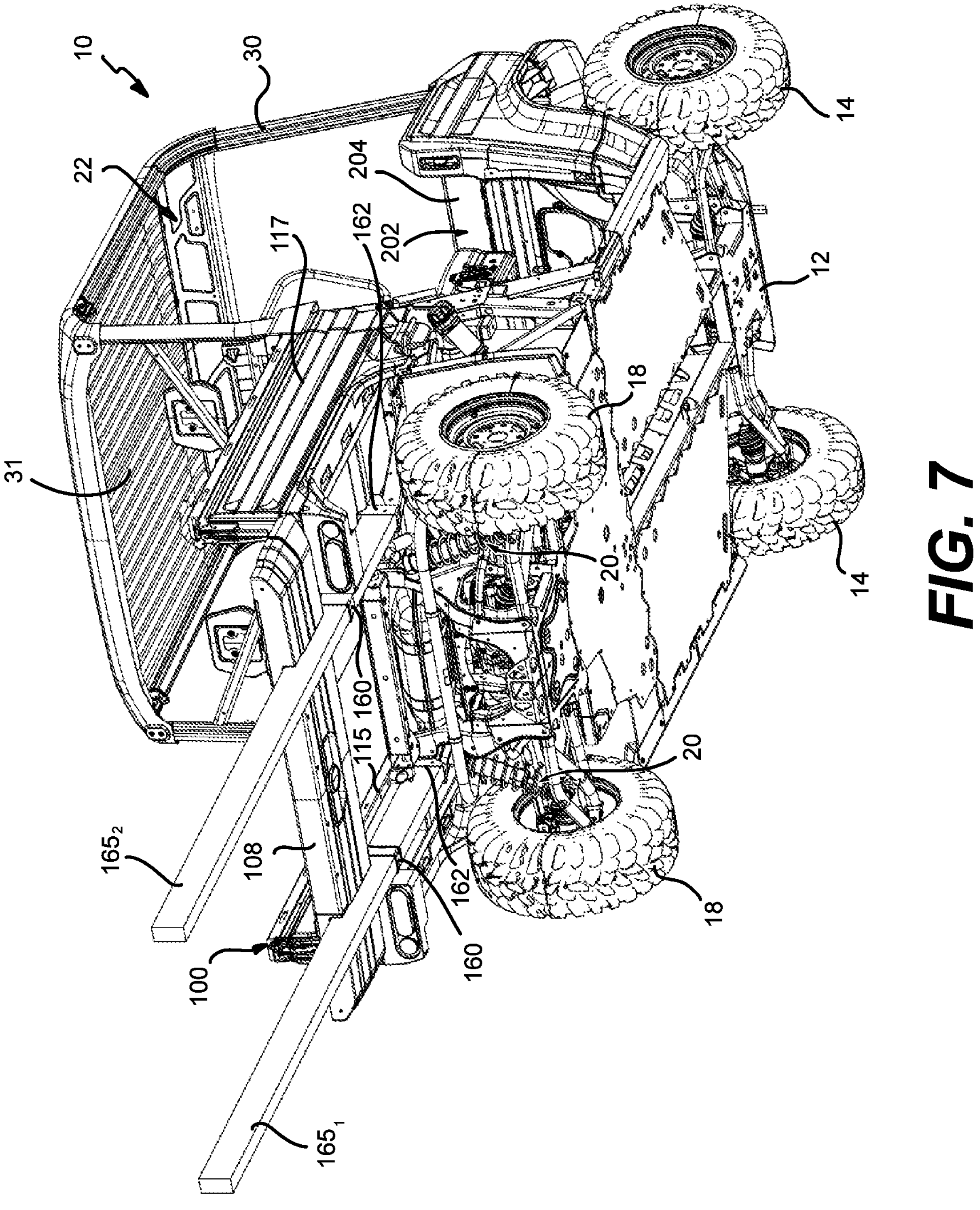
FIG. 7 is a perspective view taken from bottom, rear, right side of the vehicle of FIG. 1, showing two elongate supports held by support holders of the vehicle.

Returning to FIG. 2, in this embodiment, the vehicle 10 has support holders 160, 162 disposed below the cargo bed 100. As will be described in greater detail below and as shown in FIG. 7, the support holders 160, 162 are configured to hold two elongate supports $165_1$, $165_2$ in order to facilitate the deployment of an improvised work bench (e.g., a saw-horse). The elongate supports $165_1$, $165_2$ are sized such that, when the elongate supports $165_1$, $165_2$ are held by the support holders 160, 162, part of each of the elongate supports $165_1$, $165_2$ extends past the cargo bed 100 (i.e., outward from a periphery of the cargo bed 100). As such, a piece of material on which the user wants to work (e.g., a piece of lumber) can be set on the part of the elongate supports $165_1$, $165_2$ extending past the cargo bed 100, or a work surface may be set thereon.

As can be seen in FIG. 2, in this embodiment, the support holders 160, 162 include rear support holders 160 and front support holders 162 longitudinally spaced apart from the rear support holders 160. A pair of one of the front support holders 162 and one of the rear support holders 160 which are laterally aligned with each other receives a corresponding one of the two elongate supports $165_1$, $165_2$. It is contemplated that, in other embodiments, only the rear support holders 160 or only the front support holders 162 could be provided. In other embodiments, additional support holders 160, 162 could also be provided laterally spaced from the other support holders 160, 162 to support more elongate supports. Moreover, in other embodiments, each set of support holders supporting a given elongate support $165_1$, $165_2$ could include additional support holders such that three or more support holders (e.g., front, middle and rear support holders) could support the given elongate support $165_1$, $165_2$.

Figure 11:
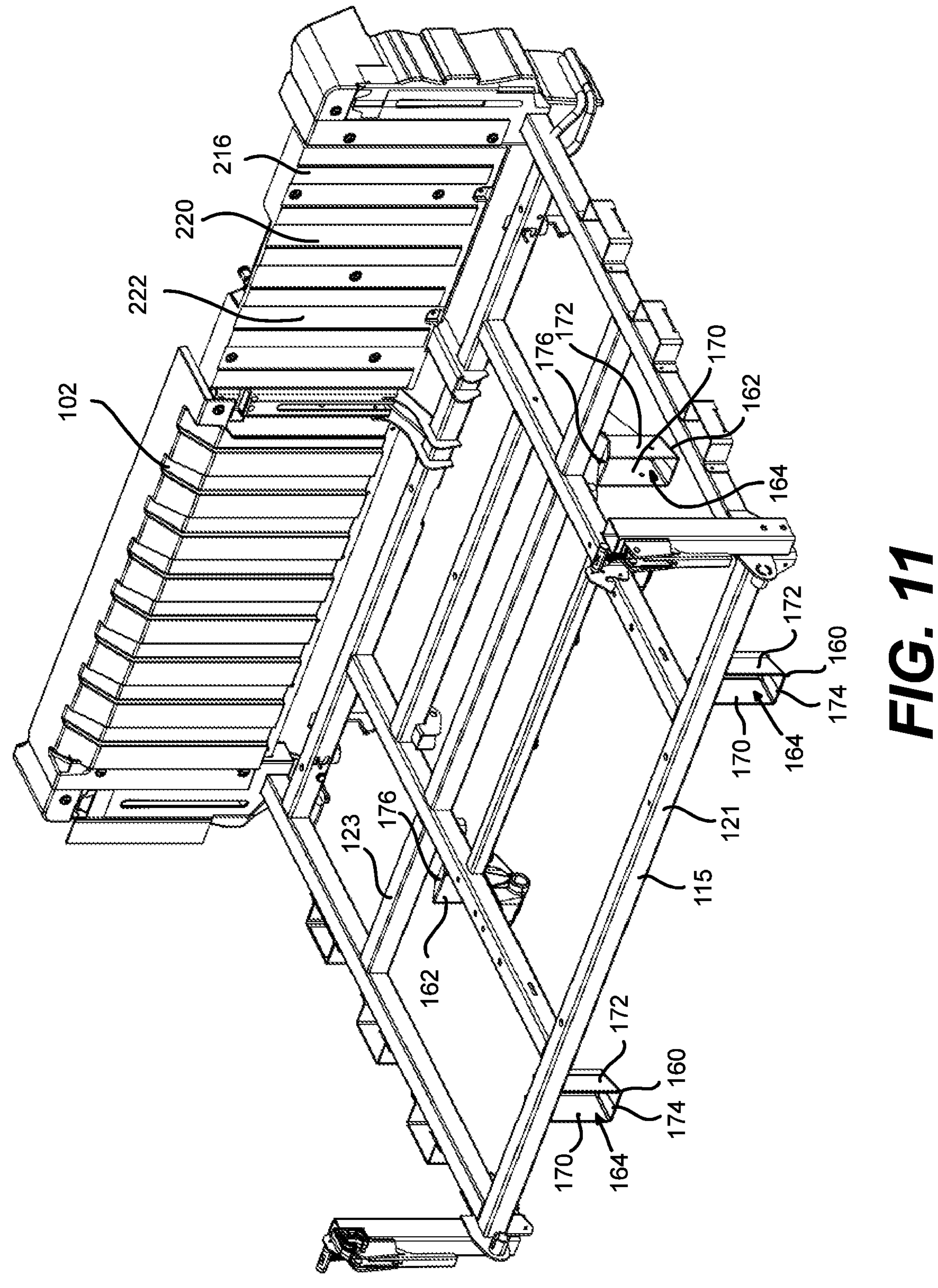
FIG. 11 is a perspective view taken from a top, rear, right side of part of the cargo bed of FIG. 9.

With reference to FIG. 11, each of the rear and front support holders 160, 162 defines at least in part an opening 164 for inserting the corresponding elongate support $165_1$, $165_2$. Notably, the opening 164 of each of the rear and front support holders 160, 162 is shaped to match a cross-sectional profile of a corresponding one of the elongate supports $165_1$, $165_2$ such that, in use, each of the rear and front support holders 160, 162 surrounds part of the corresponding one of the elongate supports $165_1$, $165_2$ to hold it in place. In this embodiment, the elongate supports $165_1$, $165_2$ are wooden beams having a rectangular cross-sectional profile and therefore the openings 164 of the rear and front support holders 160, 162 are generally rectangular. In this particular example, the wooden beams 75 are commonly referred to as "two-by-fours" in North America, namely referring to the nominal dimensions of their cross-sectional profile (two inches by four inches). The actual cross-sectional dimensions of two-by-fours are approximately 1.5 inches by 3.5 inches (i.e., 38 mm by 89 mm) due to finishing operations such as planing that are carried out before sale. Thus, in this embodiment, a width of each opening 164, measured laterally, is approximately 1.5 inches and a height of each opening 14, measured vertically, is approximately 3.5 inches. It is to be understood that the dimensions of the openings 164 may be slightly larger to allow the insertion of the elongate supports $165_1$, $165_2$.

It is contemplated that the elongate supports $165_1$, $165_2$ may be elongate supports other than two-by-fours and may have different dimensions and cross-sectional shapes.

As will be appreciated, the rear and front support holders 160, 162 are oriented such that the two elongate supports $165_1$, $165_2$ are inserted from a common side of the cargo bed 100 into the openings 164 of the support holders 160, 162. In particular, in this embodiment, the rear and front support holders 160, 162 are oriented such that the two elongate supports $165_1$, $165_2$ are inserted from a rear side of the cargo bed 100 into the openings 164 of the support holders 160, 162. As such, in this embodiment, the two rear support holders 160 are left and right rear support holders 160, and the front support holders 162 are left and right front support holders 162. In this embodiment, the left front support holder 162 and the left rear support holder 160 are laterally aligned such that their respective openings 164 are laterally aligned with each other. Similarly, the right front support holder 162 and the right rear support holder 160 are laterally aligned such that their respective openings 164 are laterally aligned with each other. Thus, as can be seen, the support holders 160, 162 are oriented such that the two elongate supports $165_1$, $165_2$ are inserted generally parallel to each other, namely longitudinally, into the openings 164 of the support holders 160, 162. It is contemplated that, in other embodiments, the support holders 160, 162 could be oriented such that the elongate supports 165$_1$, 165$_2$ are inserted at an angle relative to each other.

Figure 8:
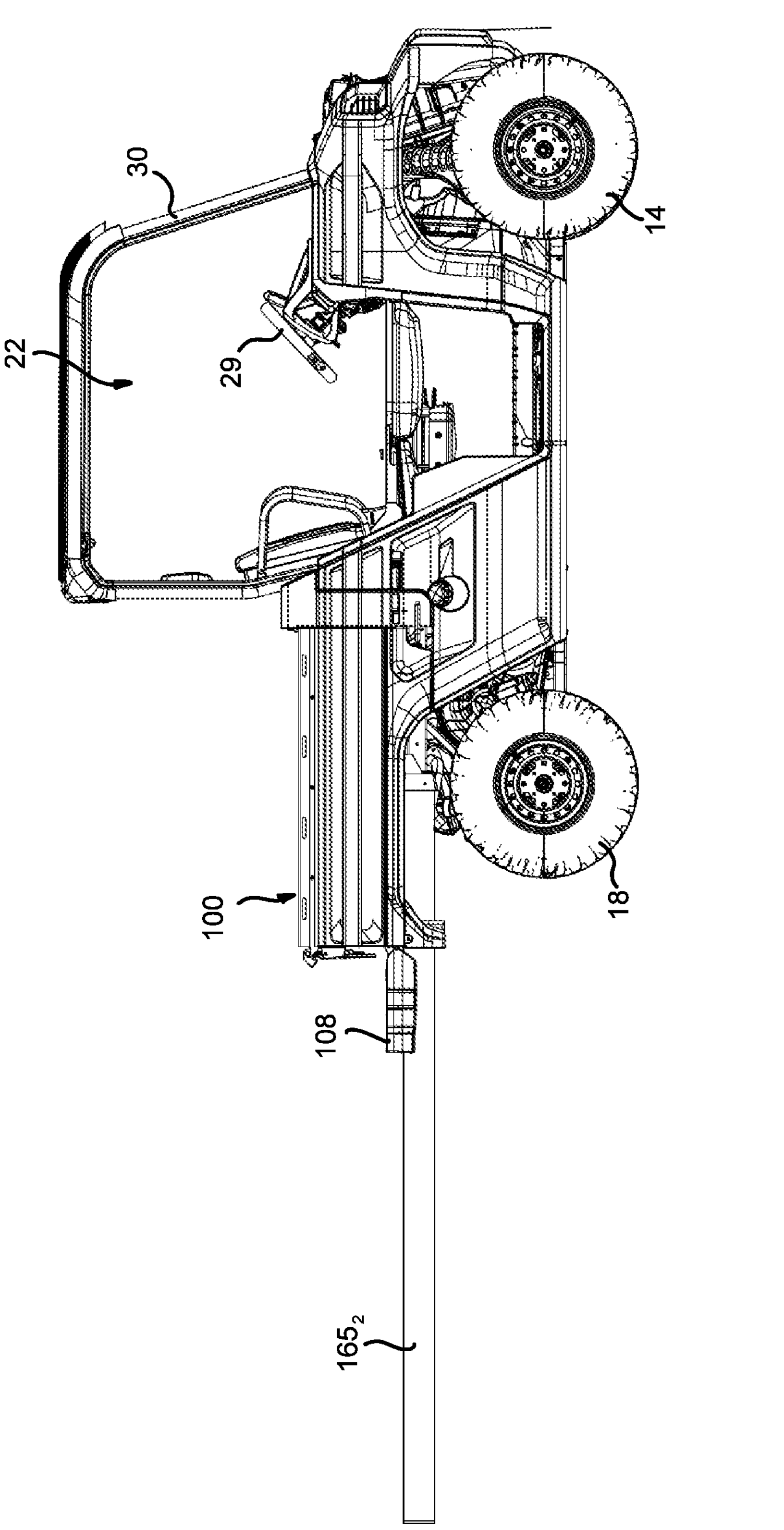
FIG. 8 is a right side elevation view of the vehicle of FIG. 7.
Figure 9:
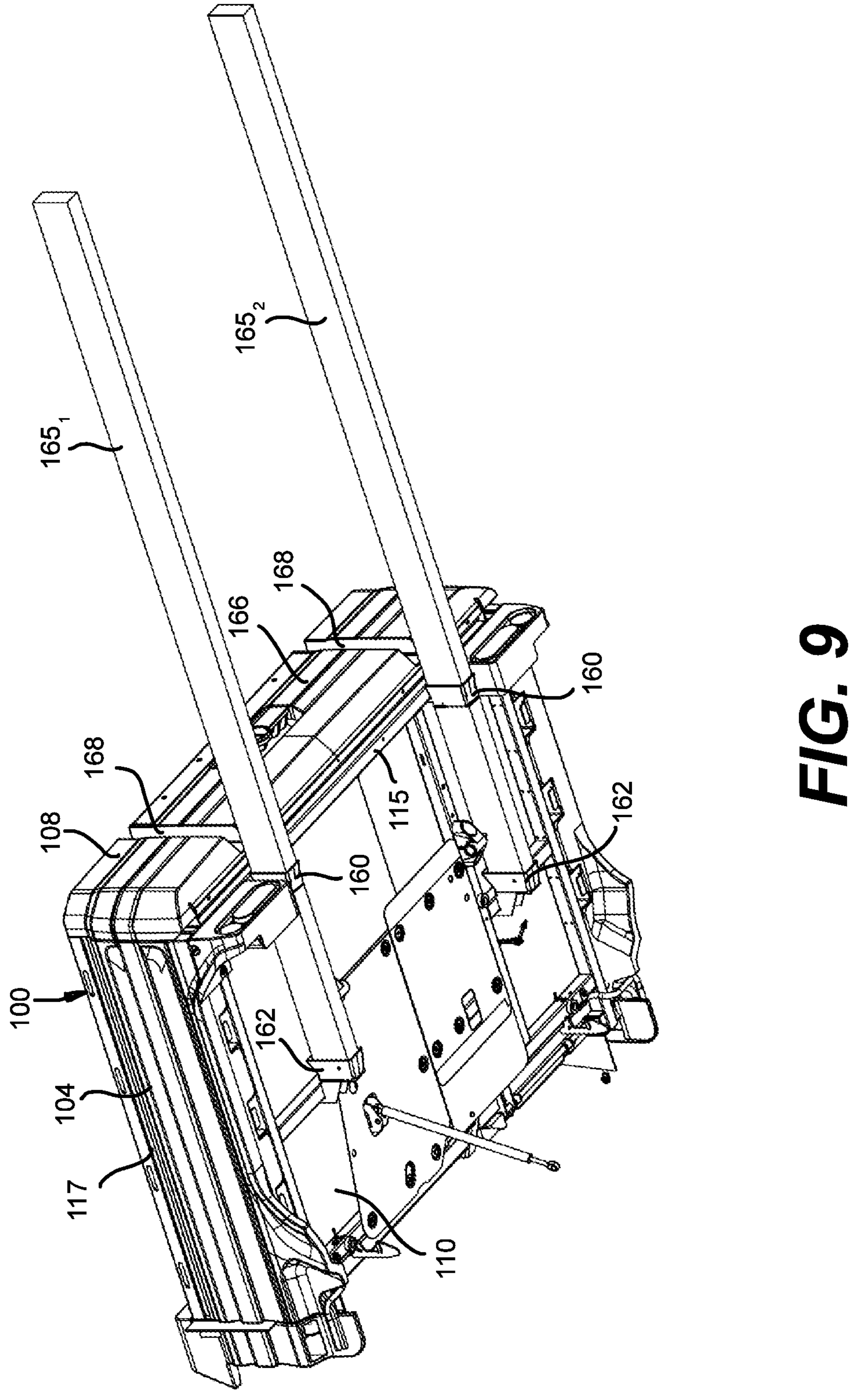
FIG. 9 is a perspective view taken from a bottom, rear, left side of the cargo bed of the vehicle of FIG. 7, showing the tailgate in a closed position.

As shown in FIG. 2, in this embodiment, an outer surface 166 of the tailgate 108 on the outer side 122 defines left and right recesses 168 which are aligned with the left support holders 160, 162 and the right support holders 160, 162 respectively to partially receive corresponding ones of the elongate supports 165$_1$, 165$_2$ in the open position of the tailgate 108, as illustrated in FIGS. 7 and 8. In particular, the left and right recesses 168 are laterally aligned with the left support holders 160, 162 and the right support holders 160, 162 respectively. In this embodiment, each of the left and right recesses 168 has a rectangular cross-sectional profile that is sized to receive part of the cross-sectional profile of the corresponding elongate support 165$_1$, 165$_2$. In this example, the left and right recesses 168 extend from the upper end 132 to the lower end 134 of the tailgate 108. The elongate supports 165$_1$, 165$_2$ may be further stabilized by being received in the recesses 168 of the tailgate 108. It is contemplated that, in some embodiments, the recesses 168 could be omitted.

In this embodiment, the left support holders 160, 162 and the right support holders 160, 162 are laterally spaced from each other are spaced by a significant distance relative to the width of the cargo bed 100. In particular, in this example, a ratio of a distance between the left support holders 160, 162 and the right support holders 160, 162 over the width of the cargo bed 100 (measured laterally) is between 0.7 and 1. The significant distance between the left and right support holders 160, 162 can help stabilize the resulting work bench that is formed by the elongate supports 165$_1$, 165$_2$ and thus minimize or otherwise prevent side-to-side tilting of the elongate supports 165$_1$, 165$_2$. In this example, the support holders 160, 162 are disposed laterally between the left and right wheels 14, 18, and the left support holders 160, 162 and the right support holders 160, 162 are disposed on opposite sides of the longitudinal centerplane of the vehicle 10.

Furthermore, in this embodiment, a ratio of a distance between the front left support holder 162 and rear left support holder 160 or between the front right support holder 162 and the rear right support holder 160 over a length of the cargo bed 100 measured longitudinally is between 0.3 and 0.5 inclusively.

It is contemplated that, in some embodiments, the support holders 160, 162 could be oriented such that the two elongate supports 165$_1$, 165$_2$ are inserted from a left side or a right side of the cargo bed 100. As will be appreciated, in such embodiments, the support holders 160, 162 would be oriented such that their respective openings 164 face the side of the cargo bed 100 from which the elongate supports 165$_1$, 165$_2$ are to be inserted.

Figure 10:
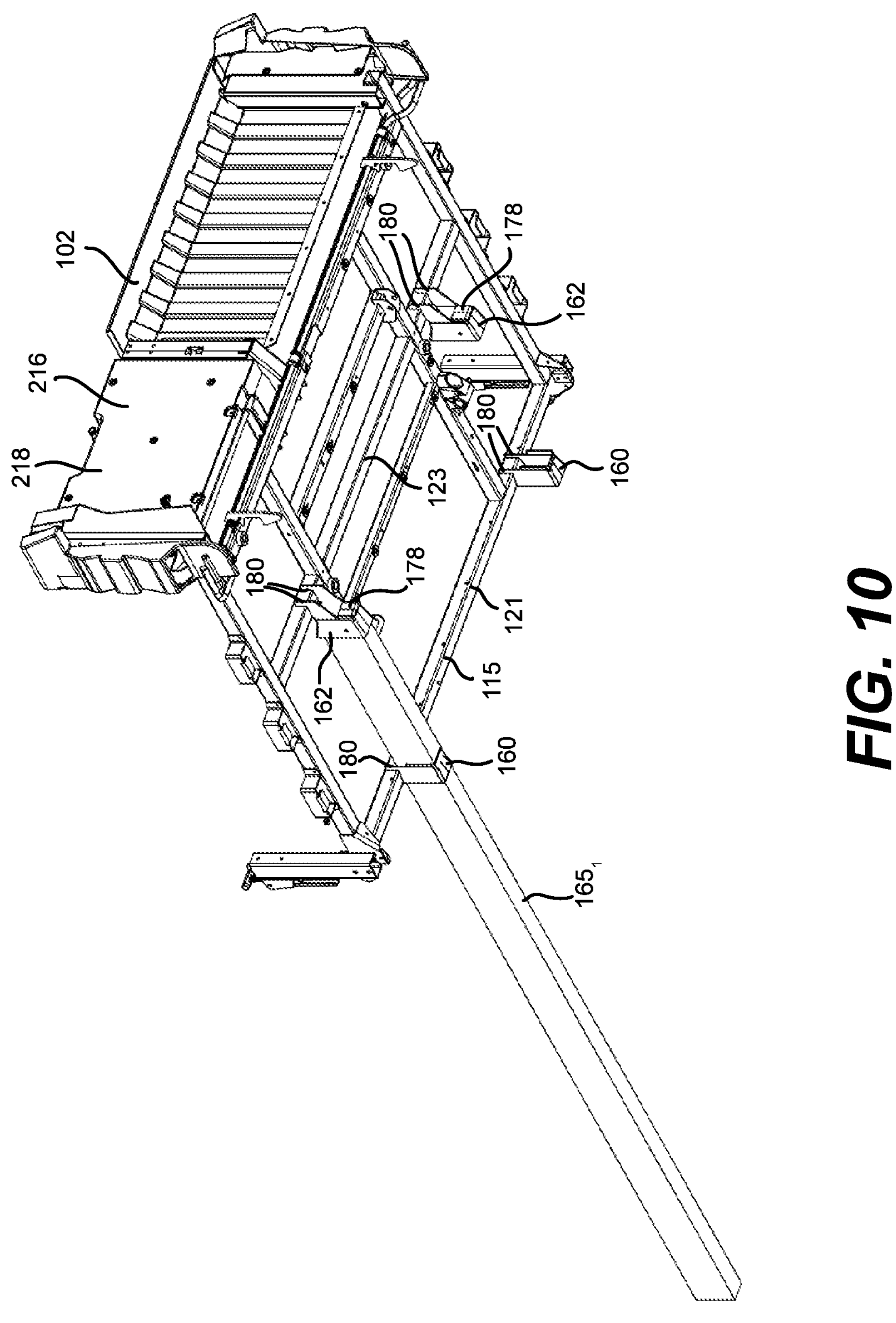
FIG. 10 is a perspective view taken from a bottom, front, right side of part of the cargo bed of FIG. 9, showing one of the elongate supports received by respective ones of the support holders of the vehicle.

As best shown in FIG. 11, in this embodiment, each of the rear and front support holders 160, 162 is a metallic bracket having left and right walls 170, 172 and a bottom wall 174 extending between the left and right walls 170, 172. It is contemplated that the support holders 160, 162 could be made from a different material in other embodiments. For each of the rear and front support holders 160, 162, the left and right walls 170, 172 and the bottom wall 174 thereof define in part the opening 164 of the support holder 160, 162. For each rear support holder 160, the opening 164 thereof is defined from a top by a rear transverse member 121 of the cargo bed frame 115 extending laterally. It is contemplated that, in other embodiments, each rear support holder 160 could instead have a top wall. For instance, in this embodiment, each front support holder 162 also has a top wall 176 which defines, together with the left and right walls 170, 172 and the bottom wall 174, the opening 164 of the support holder 162. Furthermore, as shown in FIG. 10, in this embodiment, each front support holder 162 also has a front wall 178 that acts as a stopper for an end of the corresponding elongate support 165$_1$, 165$_2$.

In this example, each of the rear and front support holders 160, 162 has a length, measured longitudinally, between approximately 2 and 4 inches inclusively (i.e., between 50 mm and 102 mm inclusively). It is contemplated that, in other embodiments, the length of the support holder 160, 162 may be significantly larger. For instance, in some embodiments, one left support holder and one right support holder could be provided, and each one could extend along a significant portion of the length of the cargo bed 100.

In this embodiment, the support holders 160, 162 are fastened to the cargo bed frame 115 of the cargo bed 100. In particular, the rear support holders 160 are fastened (e.g., welded) to the rear transverse member 121 of the cargo bed frame 115, whereas the front support holders 162 are fastened to a front transverse member 123 of the cargo bed frame 115 which extends laterally (i.e., parallel to the rear transverse member 121). More specifically, as shown in FIG. 10, in this embodiment, each support holder 160, 162 has two flanges 180 that extend from the left and right walls 170, 172 and are fastened to the corresponding one of the transverse members 121, 123.

Figure 12:
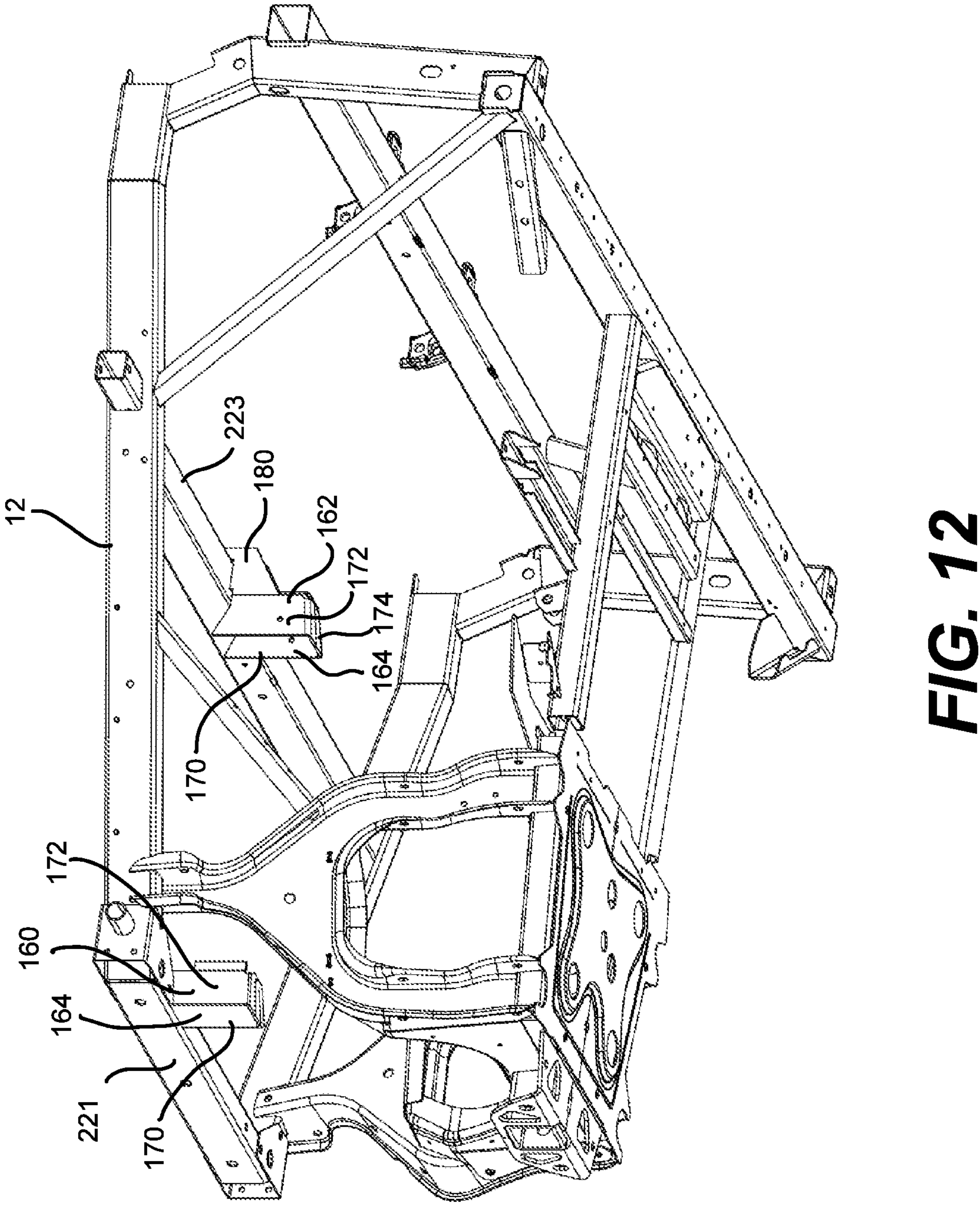
FIG. 12 is a perspective view taken from a bottom, rear, right side of a rear portion of a frame of the vehicle of FIG. 1 in accordance with an alternative embodiment in which the support holders are fastened to the frame of the vehicle.

In some embodiments, the support holders 160, 162 could be alternatively or additionally connected to the body 117 of the cargo bed 100 and/or the frame 12 of the vehicle 10. For instance, as shown in FIG. 12, in an alternative embodiment, the support holders 160, 162 are connected to the frame 12 of the vehicle 10 instead of the cargo bed frame 115. In particular, in this alternative embodiment, the rear and front support holders 160, 162 are fastened to a rear portion of the frame 12 to which the rear wheels 18 are connected. More specifically, the rear support holders 160 are fastened to a rear transverse member 221 of the frame 12, and the front support holders 162 are fastened to a front transverse member 223 of the frame 12.

Figure 13:
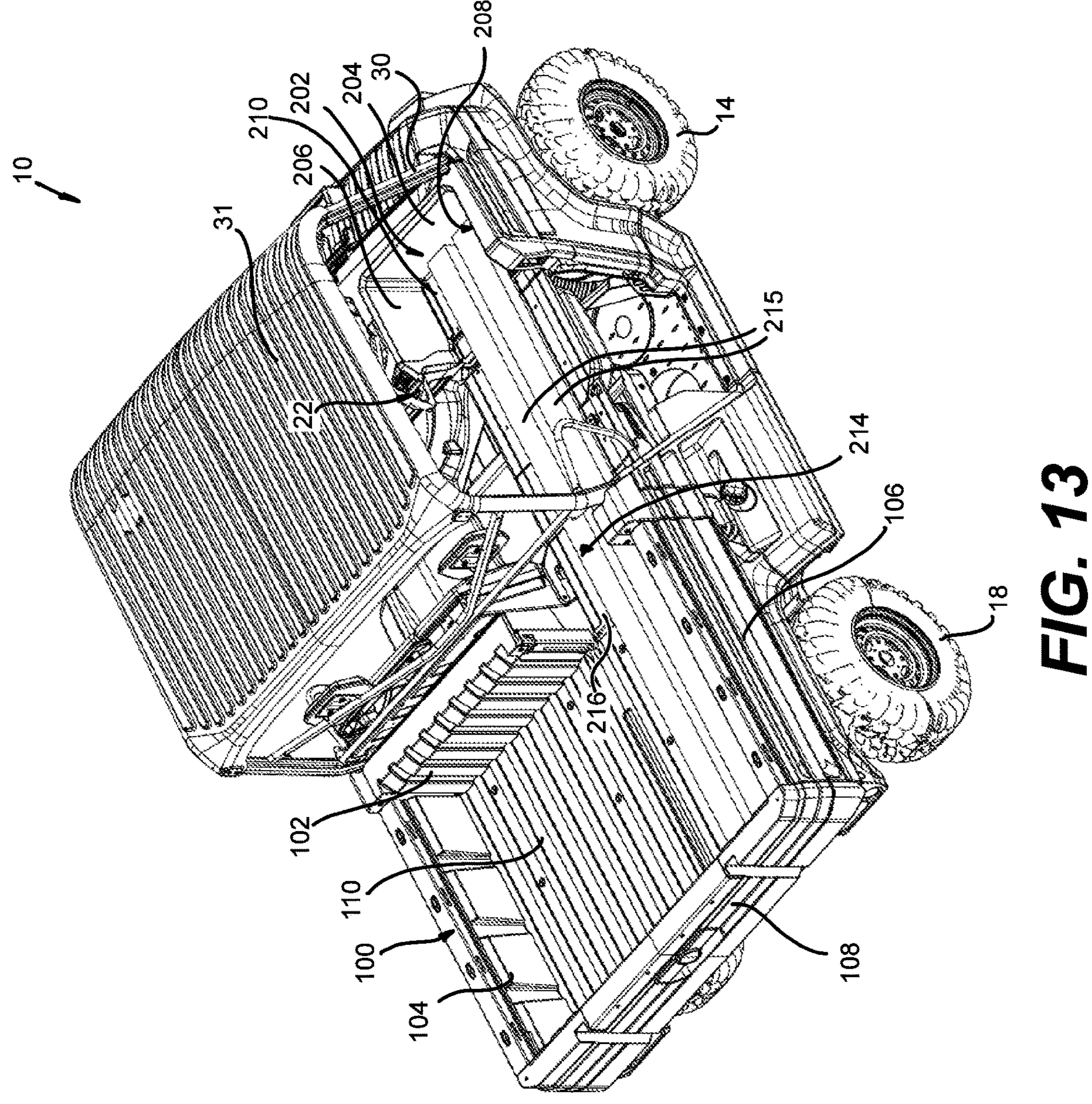
FIGS. 13 and 14 are perspective views taken from a top, rear, right side of the vehicle of FIG. 1 in configurations in which lengthy items are stored in part in the cargo bed and in part in an extension receptacle of the vehicle disposed in a cockpit area of the vehicle.
Figure 14:
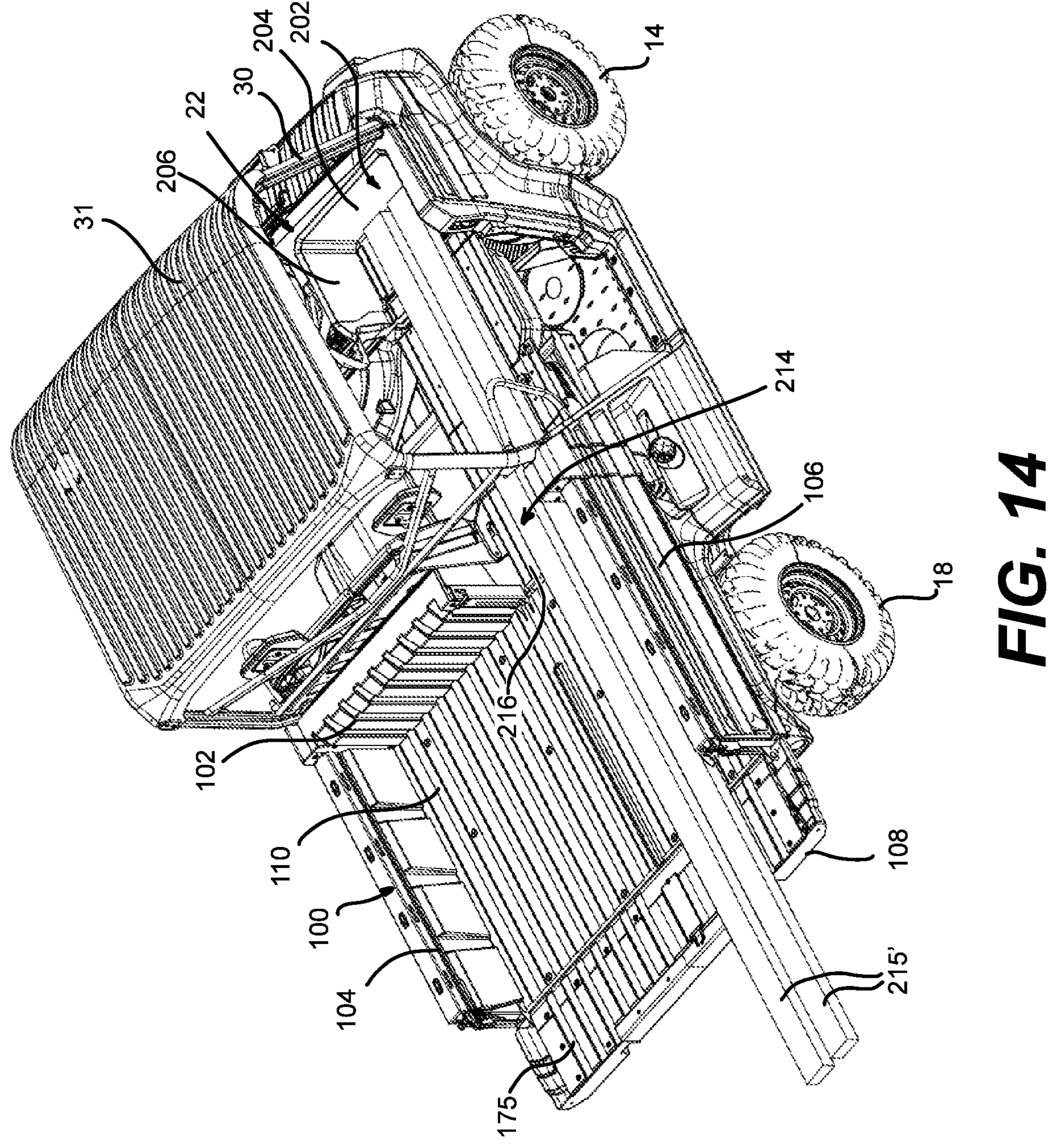
Figure 18:
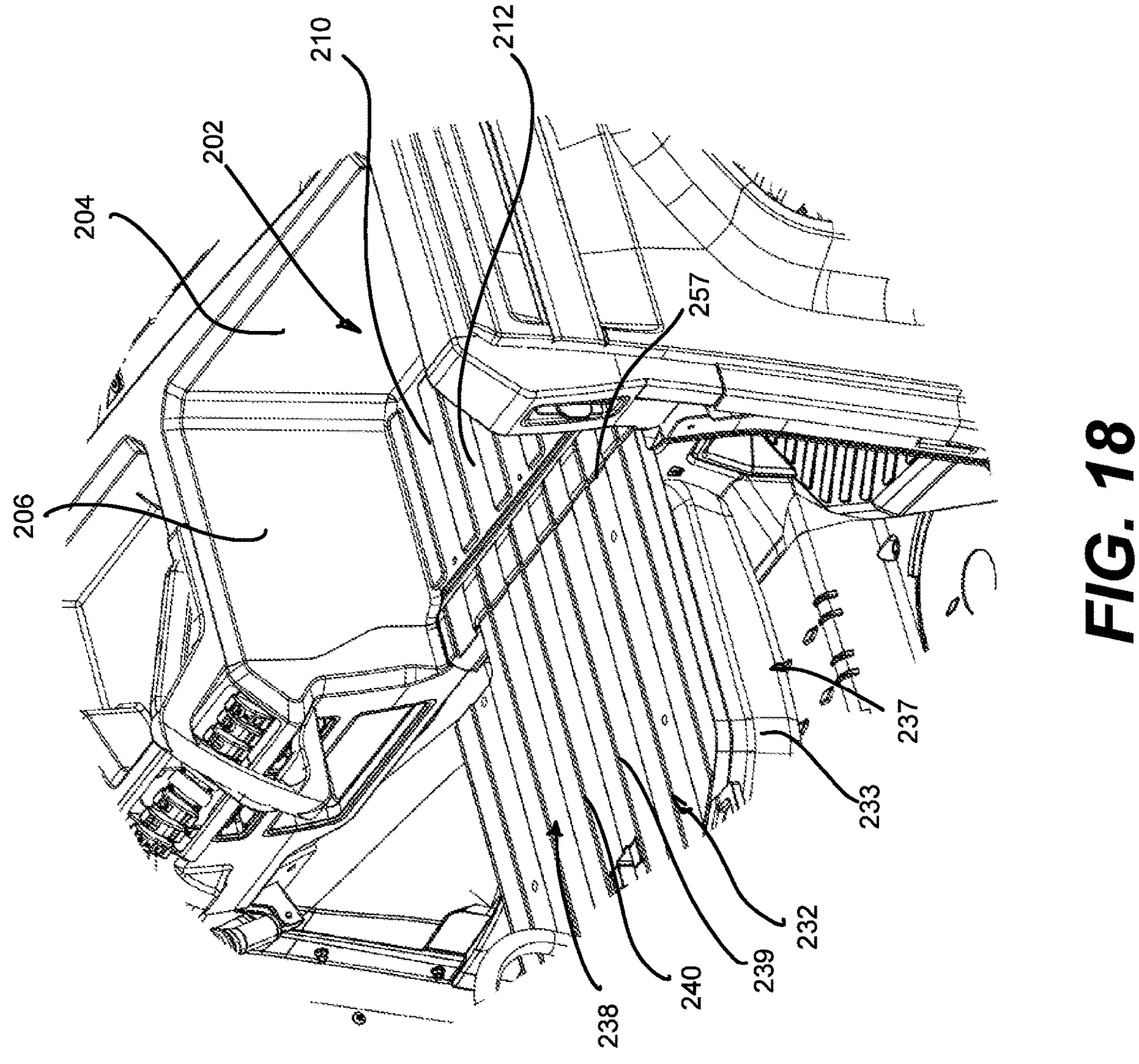
FIG. 18 is a perspective view taken from a top, rear, right side of part of the vehicle of FIG. 1 showing the seat bottom in the second position.
Figure 19:
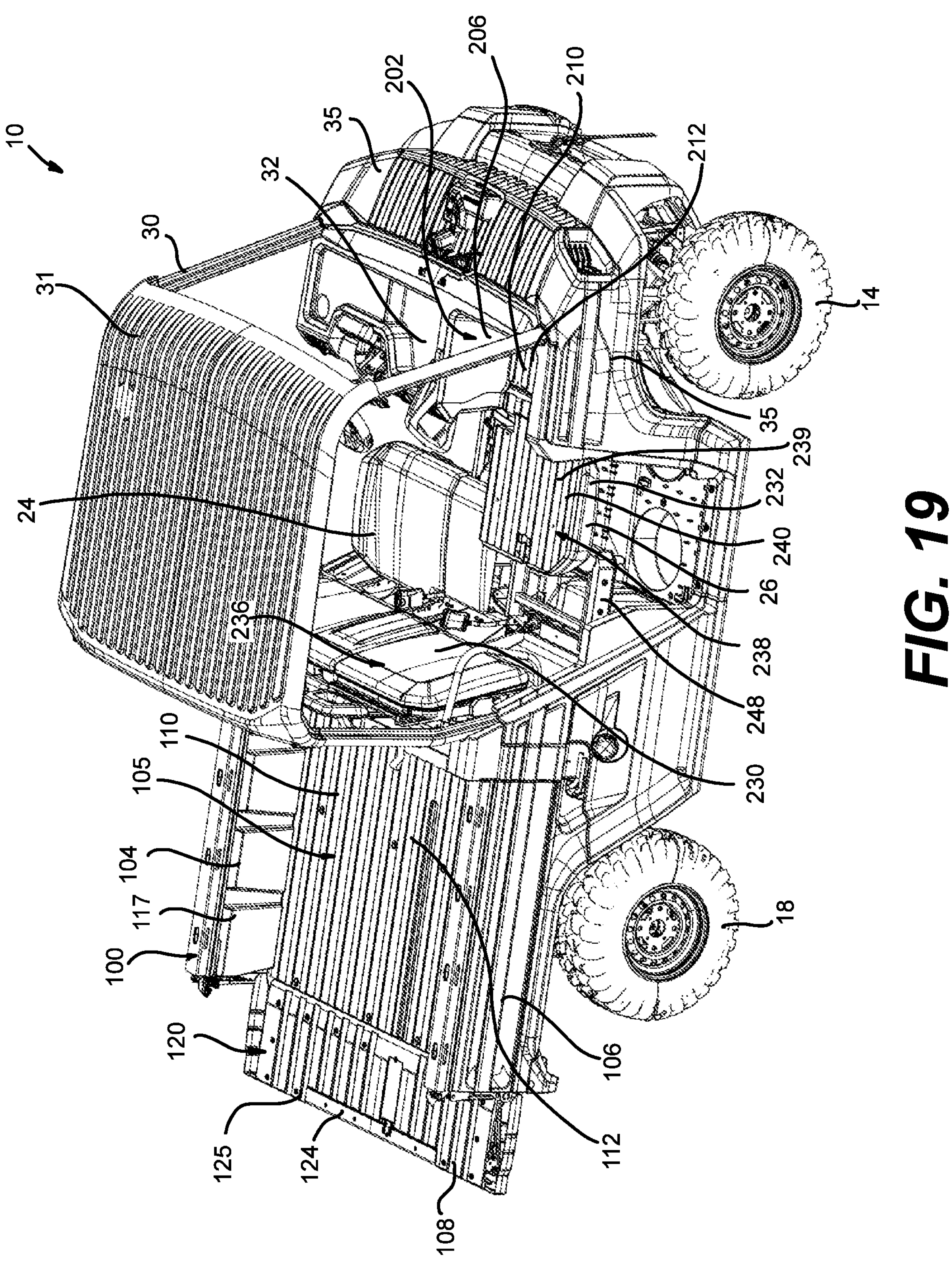
FIG. 19 is a perspective view taken from a top, front, right side of the vehicle of FIG. 1 showing the seat bottom in the second position.

Turning to FIGS. 13 and 14, in this embodiment, the vehicle 100 has an extension receptacle 202 disposed in the cockpit area 22. As can be seen, the extension receptacle 202 can receive items therein that are too lengthy to be confined to the internal space 105 of the cargo bed 100. For example, in FIG. 13, beams 215 (e.g., pieces of lumber) that are longer than the length of the cargo bed 100 are disposed in part in the cargo bed 100 (with the tailgate 108 in the closed position) and in part in the cockpit area 22, namely in the extension receptacle 202. In FIG. 14, beams 215' that are even longer than the beams 215 are disposed in part in the cargo bed 100 and extend past the cargo bed 100 (with the tailgate 108 in the open position) from the front and the rear thereof and are partially disposed in the extension receptacle 202. The extension receptacle 202 is aligned with the dashboard 32 in the longitudinal direction of the vehicle 10. In particular, in this embodiment, the extension receptacle 202 is disposed in front of the passenger seat 26. As shown in FIG. 13, the extension receptacle 202 has a front wall 204, a left side wall 206, a right side wall 208 and a bottom wall 210 which, together, define an internal space of the extension receptacle 202 in which items can be received. The bottom wall 210 defines a bottom surface 212 (FIG. 18) facing upwardly and which is configured to support the items received in the extension receptacle 202. In this embodiment, the bottom surface 212 is generally vertically aligned with the cargo bed supporting surface 112. Furthermore, the extension receptacle 202 is open at a top and a rear thereof such that a user has free access to the internal space of the extension receptacle 202. It is contemplated that, in other embodiments, a lid could be movably connected to the extension receptacle 202 to selectively close off the extension receptacle 202 at the top and the rear thereof.

Figure 29:
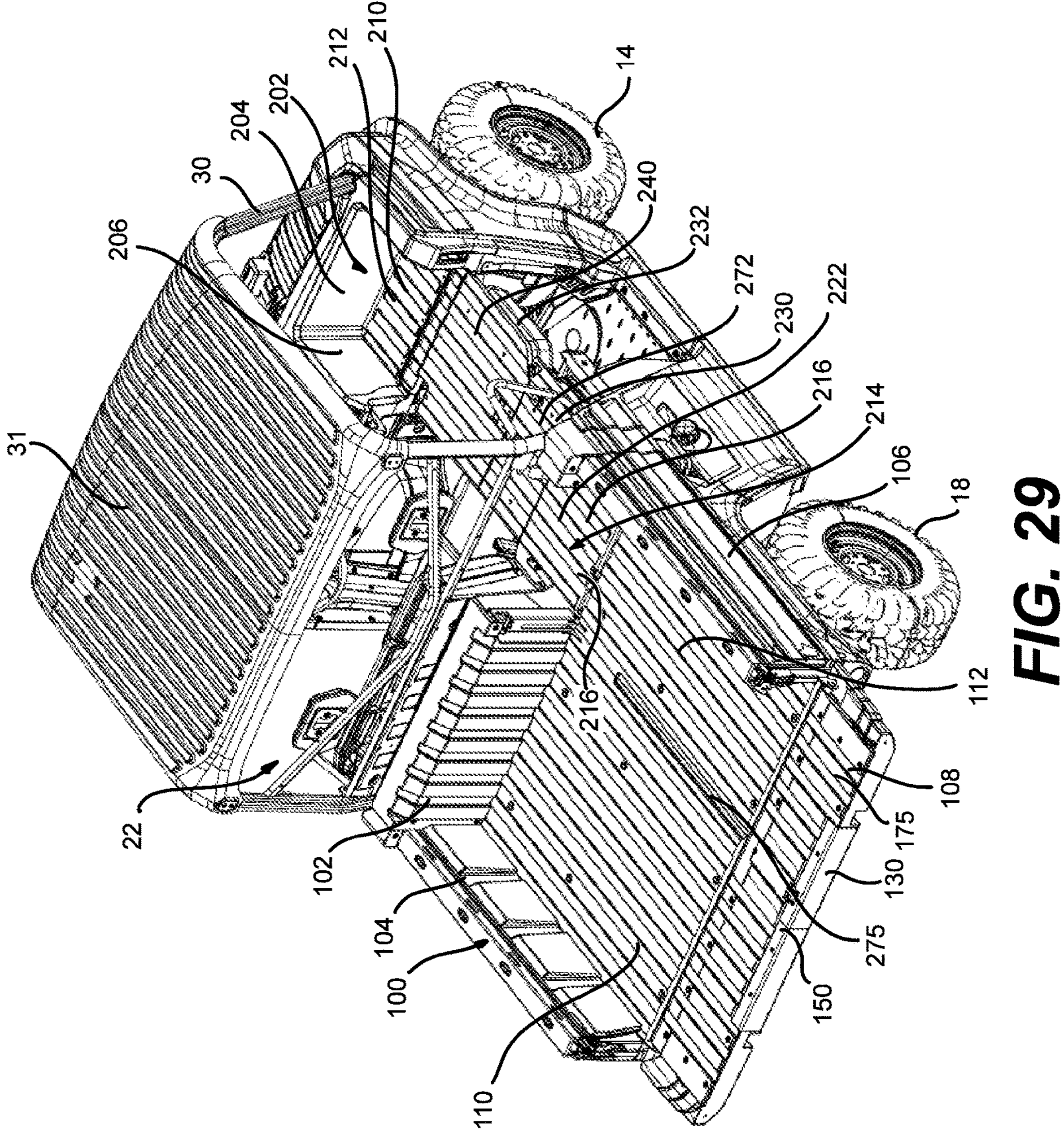
FIG. 29 is a perspective view taken from a top, rear, right side of the vehicle of FIG. 1, showing the passenger seat in the stowed position, the movable portion in the lowered position, and the tailgate in the open position.

As mentioned above, the extension receptacle 202 can receive therein items that are inserted through the cargo bed 100 and into the cockpit area 22. To that end, as shown in FIGS. 13 and 14, the cargo bed 100 defines a pass-through opening 214 that communicates the internal space 105 of the cargo bed 100 to the cockpit area 22. More specifically, the front wall 102 of the cargo bed 100 defines the pass-through opening 214 and has a movable portion 216 (best shown in FIGS. 4 to 6 and 10) that is movable to selectively cover the pass-through opening 214. The extension receptacle 202 is aligned with the pass-through opening 214 in a lateral direction of the vehicle 10 such that items inserted through the pass-through opening 214 can extend into the extension receptacle 202. In this embodiment, the movable portion 216 of the front wall 102 is a panel that is selectively pivoted about a pivot axis 119 (FIG. 28) between an upright position (FIGS. 4 to 6, 10, 11) and a lowered position (FIGS. 28, 29). In the upright position of the movable portion 216, the movable portion 216 covers the pass-through opening 214 and therefore impedes communication, through the front wall 102, between the cargo bed 100 and the cockpit area 22. In this example, in the upright position, the movable portion 216 is disposed between the fuel tank 55 and the driven pulley 64 in the longitudinal direction of the vehicle 10. Conversely, in the lowered position of the movable portion 216, the movable portion 216 uncovers the pass-through opening 214 to thereby communicate the cargo bed 100 with the cabin area 22.

In this embodiment, the pass-through opening 214 has a width, measured laterally, corresponding approximately to a width of the passenger seat 26. For instance, a ratio of the width of the pass-through opening 214 over the width of the passenger seat 26 may be between 0.8 and 1.2 inclusively. It is contemplated that the pass-through opening 214 could have a different width dimension in other embodiments.

As shown in FIGS. 10 and 11, the movable portion 216 has a front side 218 and a rear side 220 opposite the front side 218, denominated as such given their positions in the upright position of the movable portion 216. Notably, in the upright position of the movable portion 216, a rear surface 222 disposed on the rear side 220 faces rearwardly toward the internal space 105 of the cargo bed 100 and thus defines in part the internal space 105 of the cargo bed 100. In this example, the movable portion 216 has a strap 285 for pulling by a user to facilitate moving the movable portion 216 between the upright and lowered positions.

It is contemplated that, in other embodiments, the movable portion 216 may be selectively detachable from the cargo bed 100.

The movement and features of the movable portion 216 of the front wall 102 will be described in greater detail further below.

Figure 20:
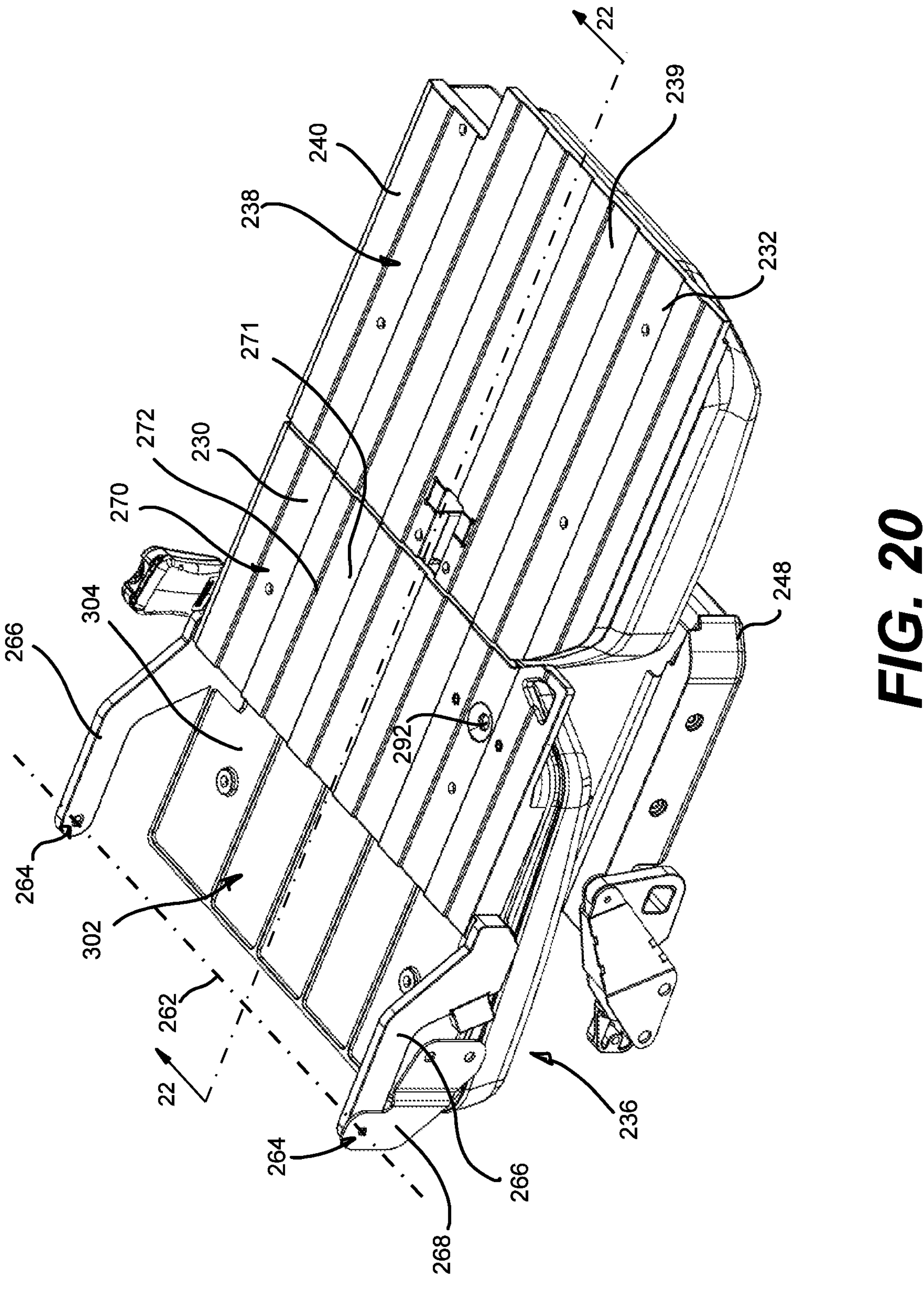
FIG. 20 is a perspective view taken from a top, front, right side of the passenger seat of FIG. 15 showing the passenger seat in a stowed position thereof.
Figure 21:
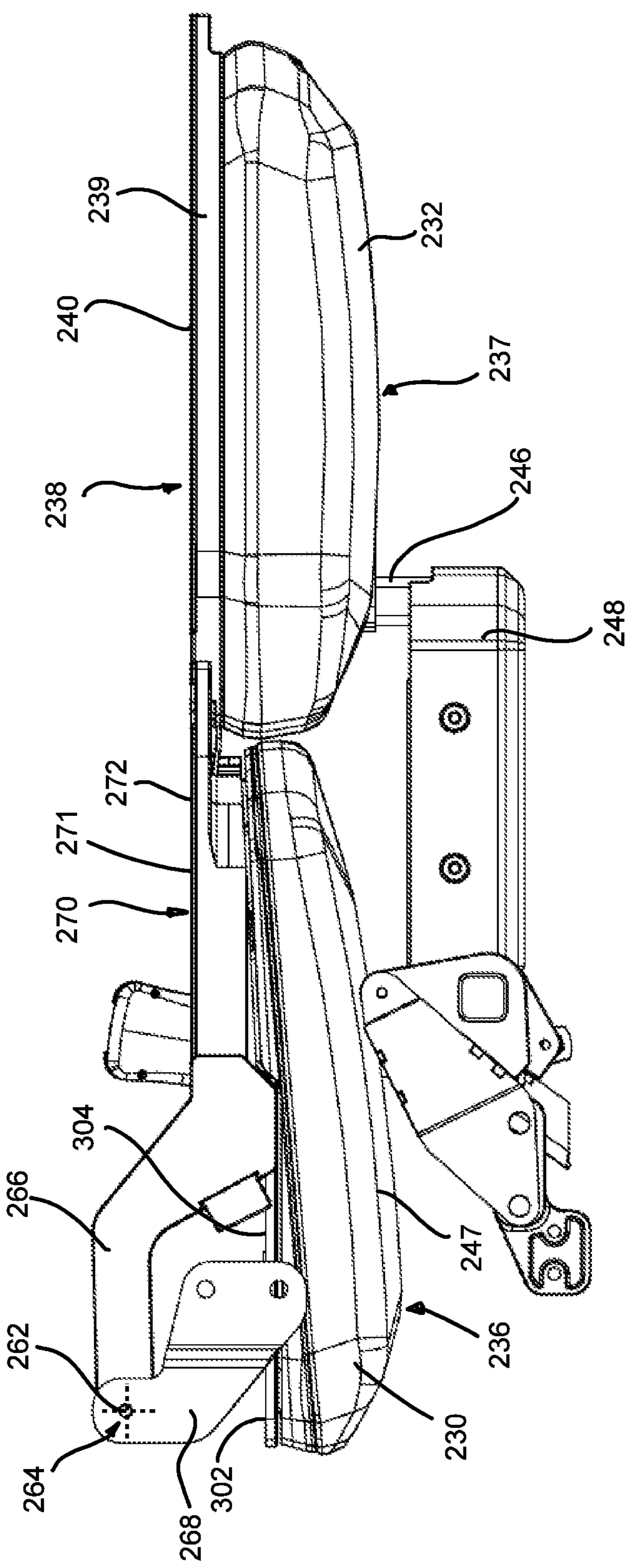
FIG. 21 is a right side elevation view of the passenger seat of FIG. 15 showing the passenger seat in the stowed position.
Figure 22:
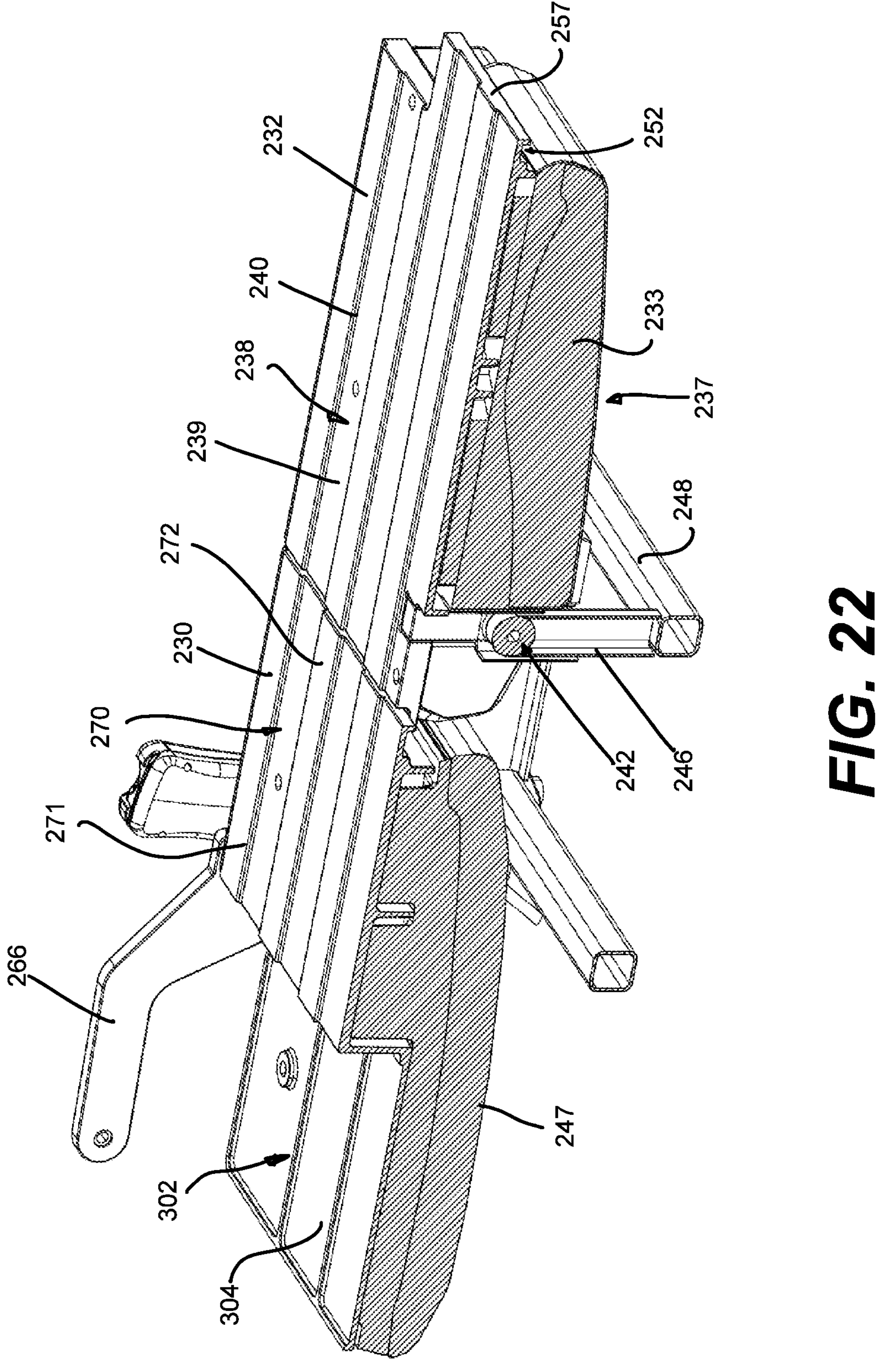
FIG. 22 is a cross-sectional view of the passenger of FIG. 15 taken along line 22-22 in FIG. 20.
Figure 23:
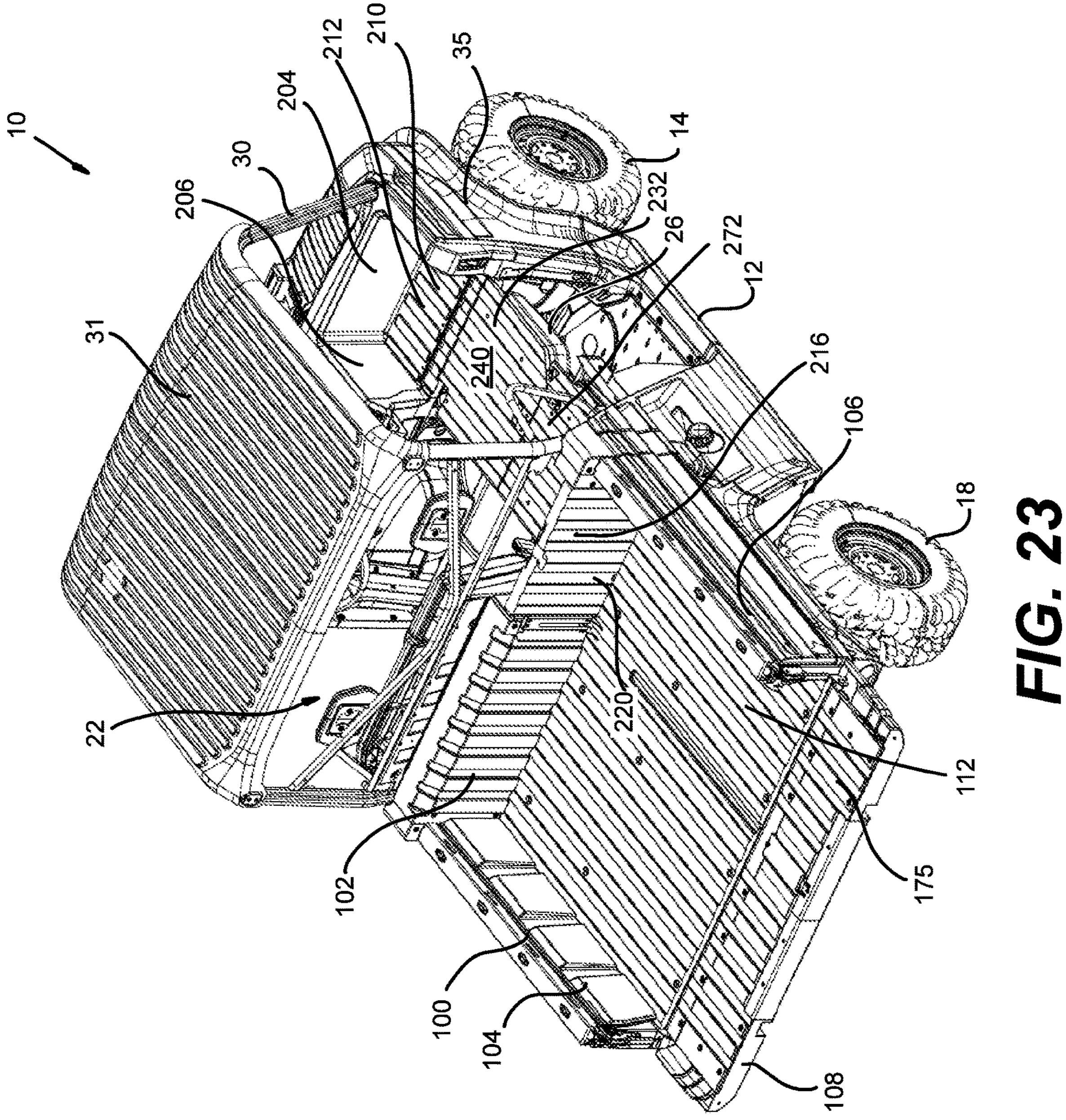
FIG. 23 is a perspective view taken from a top, rear, right side of the vehicle of FIG. 1 showing the passenger seat in the stowed position.

With reference to FIG. 1, in this embodiment, the passenger seat 26 is laterally aligned with the extension receptacle 202. Notably, the passenger seat 26 is disposed such that, in a seating position thereof in which a passenger can sit on the passenger seat 26, a backrest 230 of the passenger seat 26 is at least partially laterally and vertically aligned with the extension receptacle 202 such that the backrest 230 blocks insertion of items from the cargo bed 100 into the extension receptacle 202. The passenger seat 26 is therefore movable between the seating position (FIG. 15) and a stowed position (FIGS. 20 to 23). In particular, in the stowed position, the backrest 230 is disposed clear of the pass-through opening 214 to allow insertion of items from the cargo bed 100 into the extension receptacle 202. With reference to FIG. 20, both the backrest 230 and a seat bottom 232 of the passenger seat 26 are moved during movement of the passenger seat 26 between the seating and stowed positions. In contrast, as shown in FIGS. 13 and 14, a headrest 234 of the passenger seat 26 is fixed to the roll cage 30 of the vehicle 10 and thus the backrest 230 and the seat bottom 232 move relative to the headrest 234 as the passenger seat 26 is moved to the stowed position or the seating position.

Figure 15:
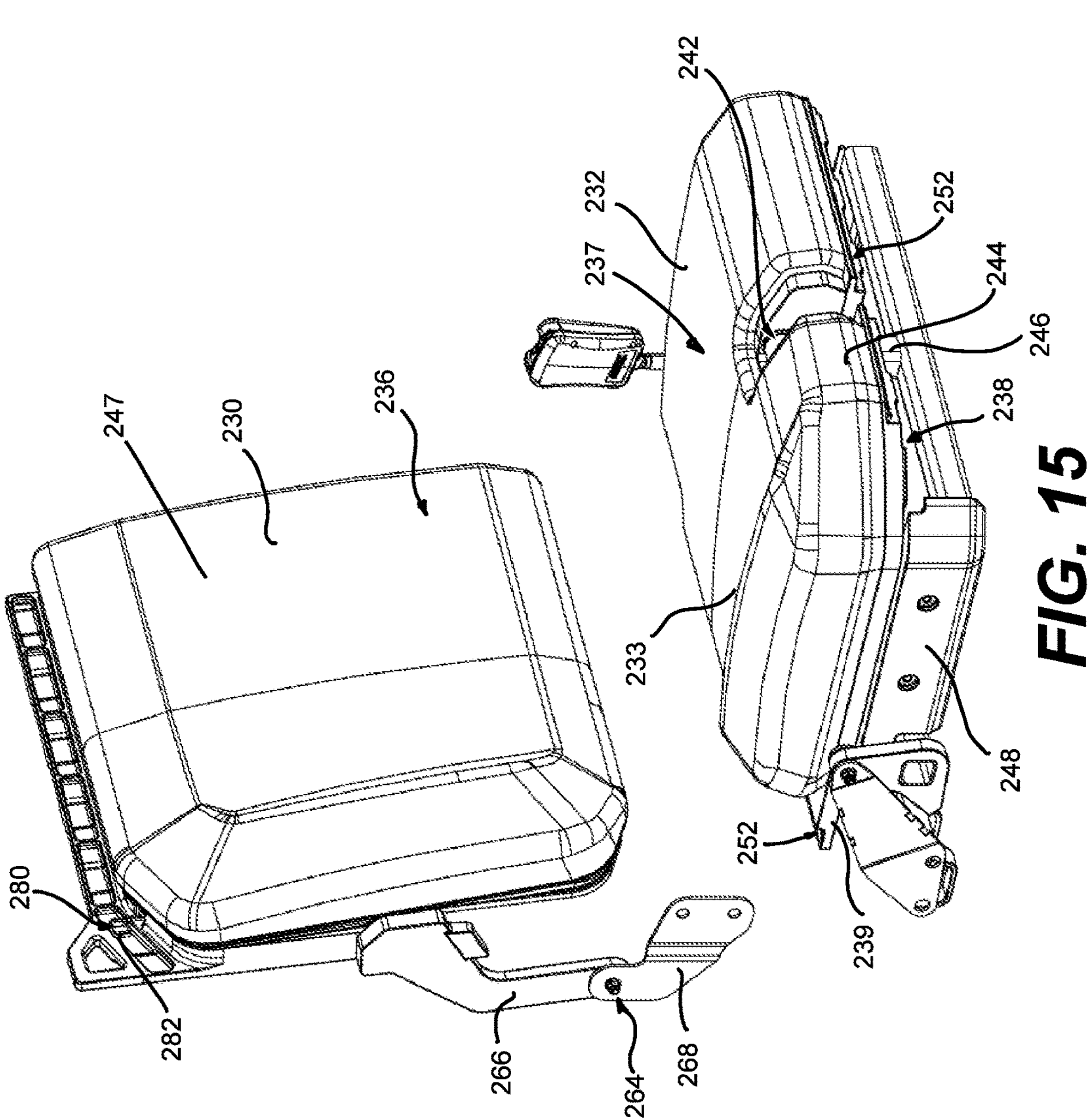
FIG. 15 is a perspective view taken from a top, front, right side of a passenger seat of the vehicle of FIG. 1 in a seating position thereof in which a backrest of the passenger seat is in a first backrest position and a seat bottom of the passenger seat is in a first position.
Figure 16:
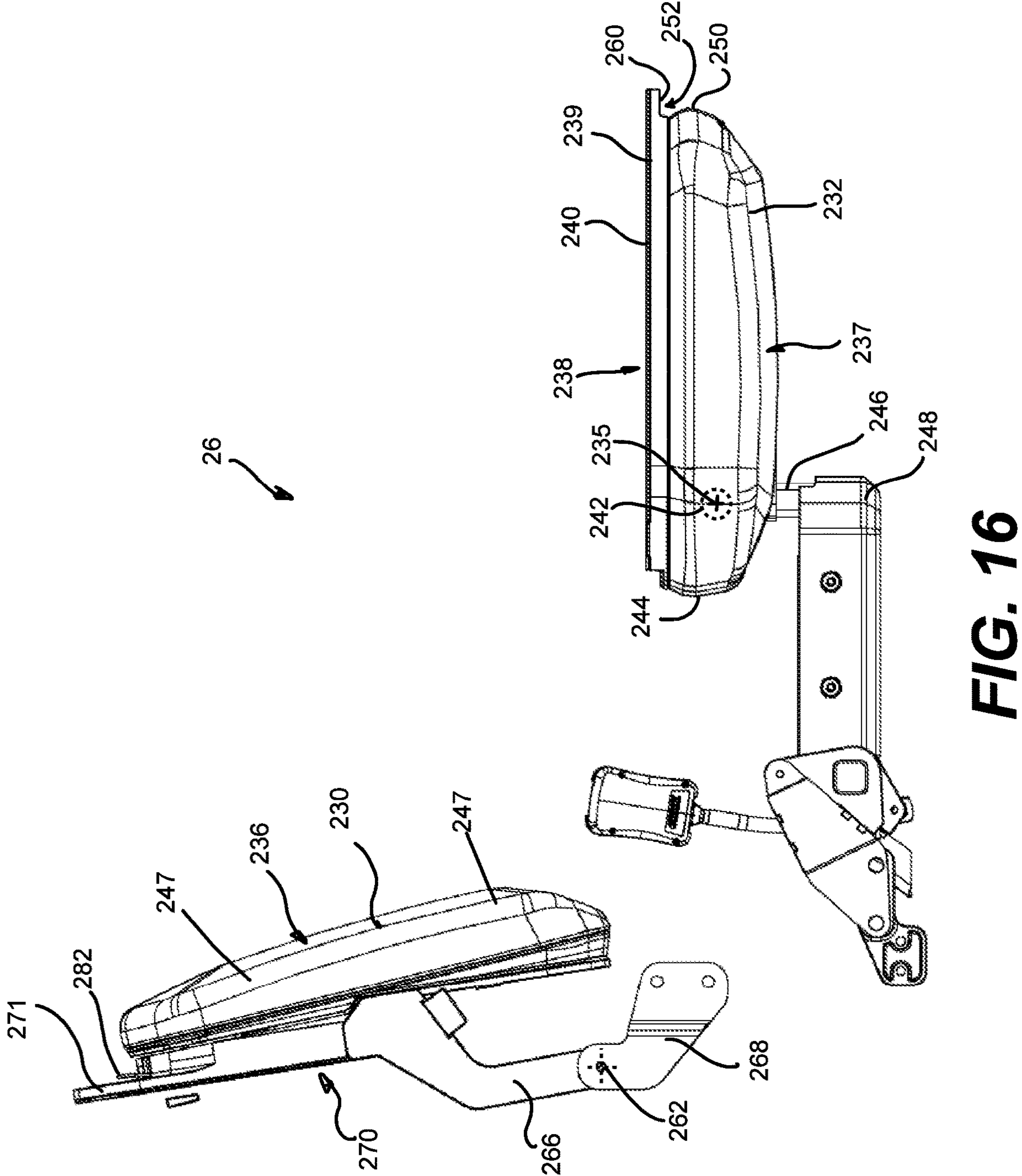
FIG. 16 is a right side elevation view of the passenger seat of FIG. 15 showing the seat bottom of the passenger seat in a second position thereof.

As best shown in FIG. 15, in the seating position of the passenger seat 26, the backrest 230 is disposed such that a back resting side 236 thereof faces forwardly to support the passenger's back, while the seat bottom 232 has a passenger supporting side 237 facing upward to support the passenger thereon. Notably, the back resting side 236 has a cushion 247 on which the passenger can rest his/her back and the seat bottom 232 has a cushion 233 on the passenger supporting side 237 so that the passenger can be seated on the cushion 233. In this embodiment, moving the passenger seat 26 to the stowed position begins by moving the seat bottom 232 from a first position (FIG. 15) to a second position (FIG. 16). In particular, as shown in FIG. 16, in moving the seat bottom 232 from the first position to the second position, the seat bottom 232 is pivoted about a pivot axis 235 defined by a pivot 242 such that the passenger supporting side 237 of the seat bottom 232 faces downward whereas a cargo supporting side 238 of the seat bottom 232 (opposite the passenger supporting side 237) faces upward. In other words, in moving the passenger seat 26 between the seating and stowed positions, the seat bottom 232 is flipped about the pivot axis 235 such that the orientations of the passenger supporting side 237 and the cargo supporting side 238 are reversed.

In this embodiment, the seat bottom 232 has a rigid backing 239 on the cargo supporting side 238 made of a rigid material (e.g., plastic). The rigid backing 239 has a supporting surface 240 that is configured to support items thereon (such as the beams 215, 215' shown in FIGS. 13 and 14). As such, when the cargo supporting side 238 faces upward, the supporting surface 240 of the rigid backing 239 is allowed to support items thereon.

With reference to FIGS. 15 and 16, the pivot 242 about which the seat bottom 232 is pivotable between the first and second positions is located such that the seat bottom 232 pivots forwardly as the passenger seat 26 is moved from the seating position to the stowed position. As such, the pivot 242 is located near a front end 244 of the seat bottom 232 (i.e., closer to the front end 244 than to a rear end 246 of the seat bottom 232). The front end 244 and the rear end 246 of the seat bottom 232 are denominated as such given their positions in the seating position of the passenger seat 26. In this example, the pivot 242 is disposed at the end of an arm 246 that extends upwardly from a seat base 248 which supports the seat bottom 232 in the seating position of the passenger seat 26. In particular, in this example, the pivot 242 is located generally centrally along a width of the seat bottom 232. The pivot 242 may be configured differently in other embodiments.

Figure 17:
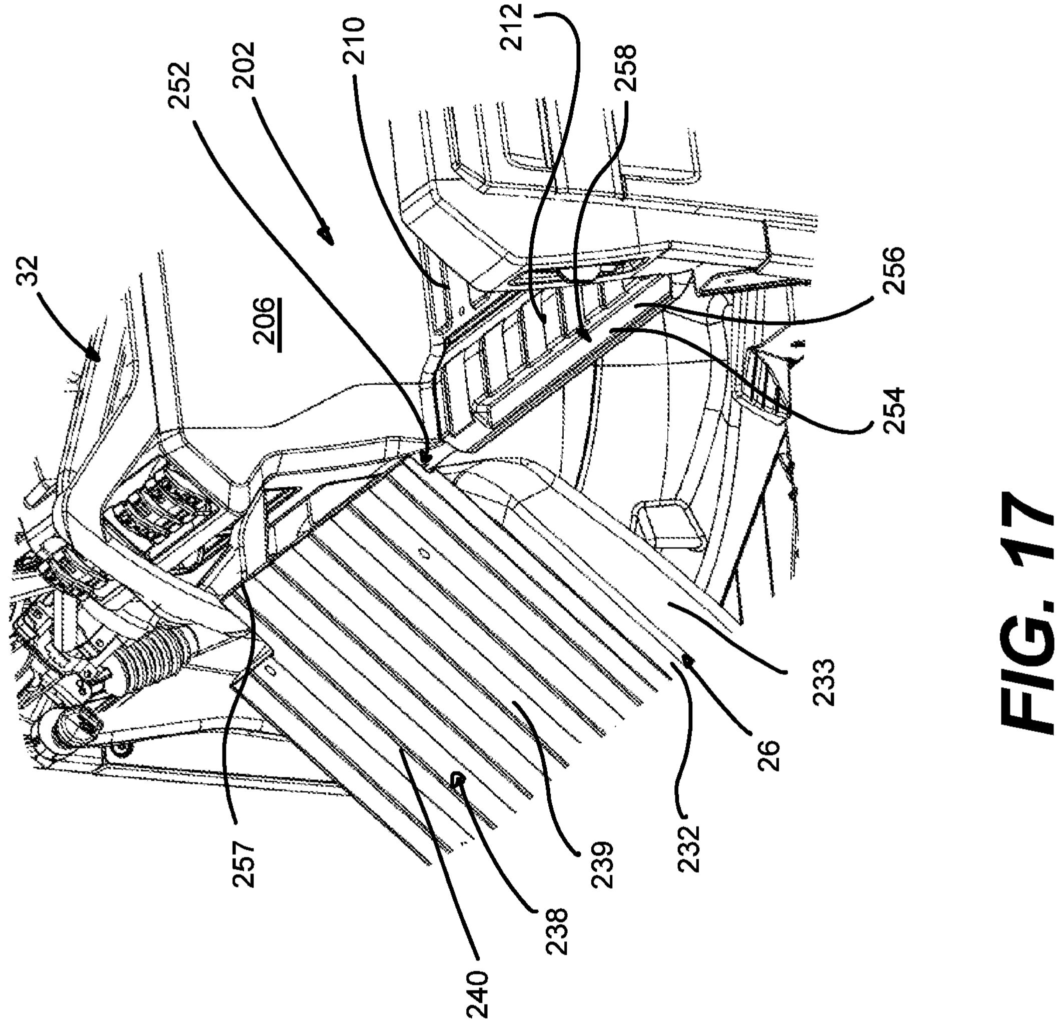
FIG. 17 is a perspective view taken from a top, rear, right side of part of the vehicle of FIG. 1 showing the seat bottom in transition from the first position to the second position.

As shown in FIGS. 15 to 17, in this embodiment, the rigid backing 239 of the seat bottom 232 defines a recess 252 at an end 257 thereof that is disposed forward of the pivot 242 in the stowed position of the passenger seat 26. As can be seen, in the stowed position of the passenger seat 26, the recess 252 faces downward. With reference to FIG. 17 which illustrates part of the seat bottom 232 in transition from the first position to the second position, the recess 252 is configured to receive an end portion 254 of the bottom wall 210 of the extension receptacle 202 in the stowed position of the passenger seat 26. In particular, the end portion 254 has a mating surface 256 facing upwardly that defines in part a recess 258. Once the seat bottom 232 is pivoted to the second position corresponding to the stowed position of the passenger seat 26, the mating surface 256 of the extension receptacle 202 is mated with a corresponding mating surface 260 (FIG. 16) of the rigid backing 239 that defines in part the recess 252. This locates the end of the seat bottom 232 relative to the extension receptacle 202 and allows the supporting surface 240 of the seat bottom 232 to be continuous with the bottom surface 212 of the extension receptacle 202. Notably, the supporting surface 240 of the seat bottom 232 is generally vertically aligned with the bottom surface 212 in the stowed position of the passenger seat 26 and therefore is similarly generally vertically aligned with the cargo bed supporting surface 112.

To complete moving the passenger seat 26 to the stowed position, in this embodiment, once the seat bottom 232 is in its second position, the backrest 230 is moved from a first backrest position (shown in FIGS. 15, 16) to a second backrest position (shown in FIGS. 20 to 23). In this embodiment, the backrest 230 is pivotable between the first and second backrest positions about a pivot axis 262 defined by two pivots 264. Each pivot 264 is formed between a respective side arm 266 of the backrest 230 and left and right fixed brackets 268 (only one of which is shown in the Figures). The backrest 230 is pivoted forwardly about the pivot axis 262 as it pivots from the first backrest position to the second backrest position. As best shown in FIG. 20, in the second backrest position and thus in the stowed position of the passenger seat 26, a posterior side 270 of the backrest 230, opposite the back resting side 236, faces upwardly to support items thereon. The backrest 230 has a rigid backing 271 on the posterior side 270 made of a rigid material (e.g., plastic). The rigid backing 271 has a supporting surface 272 that is configured to support items thereon. In the second backrest position and thus in the stowed position of the passenger seat 26, is generally vertically aligned with the supporting surface 240 of the seat bottom 232, with the bottom surface 212 of the extension receptacle 202 and with the cargo bed supporting surface 112. In particular, in the stowed position of the passenger seat 26, the supporting surface 272 of the backrest 230 is continuous with the supporting surface 240 of the seat bottom 232.

Figure 24:
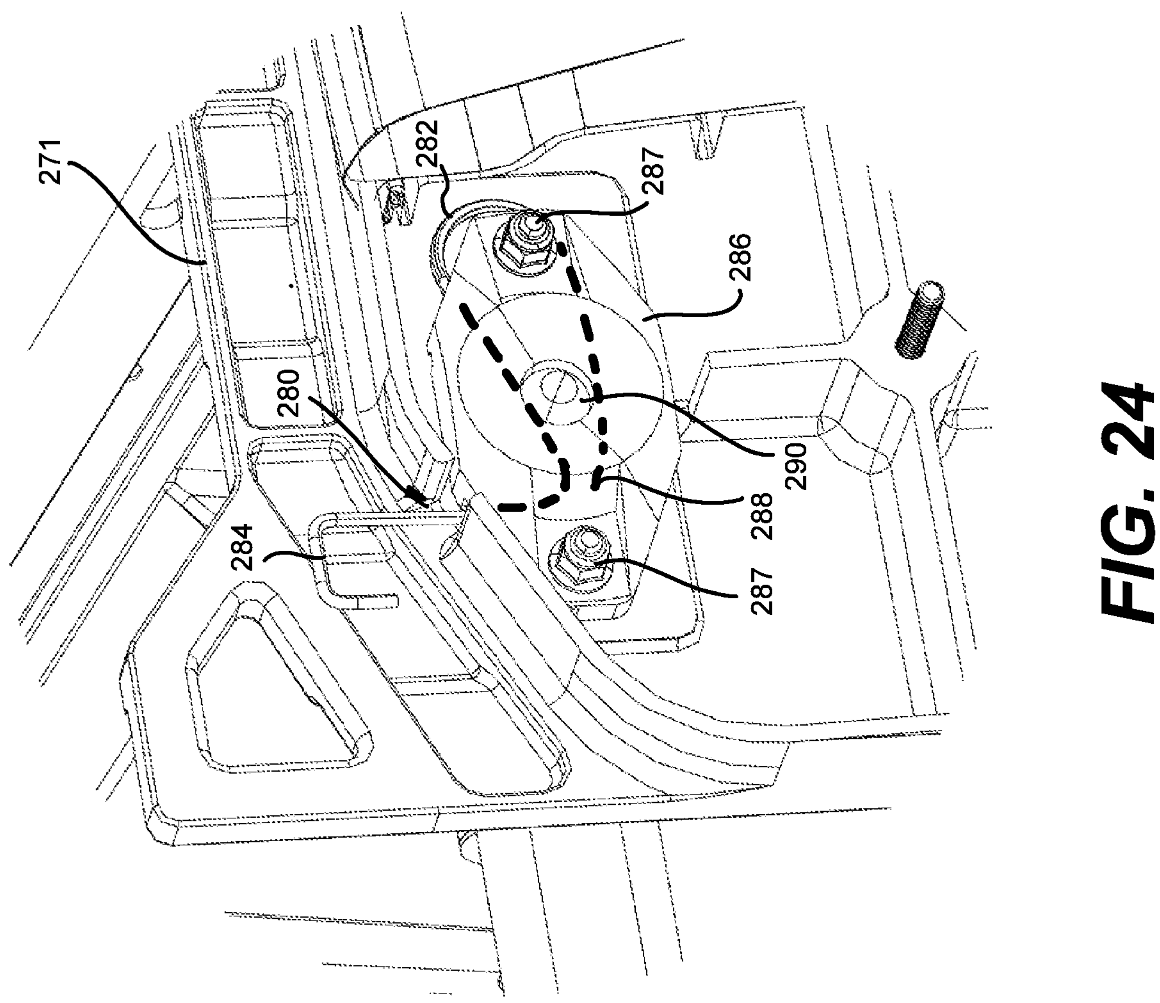
FIG. 24 is a perspective view taken from a top, front, right side of part of the backrest of the passenger seat of FIG. 15 shown with part of the backrest removed to expose a lock thereof.
Figure 25:
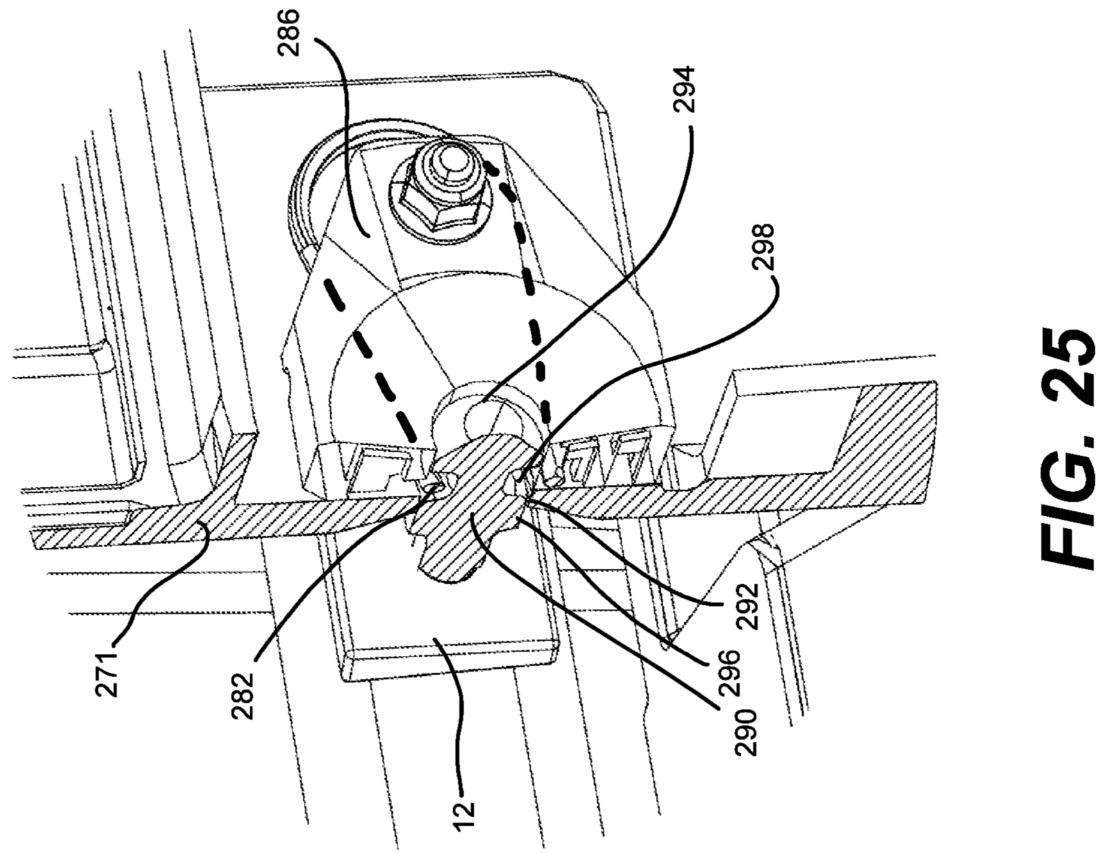
FIG. 25 is a perspective view taken from a top, front, right side of a cross-section of the lock of FIG. 24.

With reference to FIGS. 24 and 25, in this embodiment, the passenger seat 26 has a lock 280 for selectively locking the backrest 230 in the seating position of the passenger seat 26. Notably, as shown in FIG. 15, the lock 280 includes a retaining member 282 having an end portion 284 in the form of a handle that extends from an upper end of the backrest 230 for accessing by the user. Returning to FIG. 24, in this example, the retaining member 282 is contained in part within a casing 286, with the end portion 284 extending out of the casing 286. The casing 286 is affixed to the rigid backing 271 by fasteners 287 and is disposed between the cushion 247 and the rigid backing 271 of the backrest 230. In this embodiment, the retaining member 282 is a spring wire having a fixed end 288 disposed within the casing 286. As shown in FIG. 25, a locking pin 290 that is fixed to the frame 12 is configured to extend, in the seating position of the passenger seat 26, through an opening 292 defined by the rigid backing 271. In particular, in the seating position of the passenger seat 26, part of the locking pin 290 is received within the casing 286 to allow the retaining member 282 to engage the locking pin 290. The locking pin 290 has a head 294 and an enlarged body portion 296 separated from each other by an annular groove 298. In a locked position of the retaining member 282, part of the retaining member 282 extends within the annular groove 298, thereby preventing the head 294 from being dislodged from the backrest 230 which in turn prevents the backrest 230 from being moved to the second backrest position. In order to unlock the backrest 230, the end portion 284 of the retaining member 282 is lifted upwardly thereby moving the part of the retaining member 282 in the annular groove 298. Once the retaining member 282 is no longer received in the annular groove 298, the backrest 230 can be pivoted forward such that the locking pin 290 is removed from the backrest 230 through the opening 292. In this embodiment, the retaining member 282 is biased to be in the lowered position whereby the retaining member 282 is in a position to be inserted into the annular groove 298.

It is contemplated that the lock 280 could be configured differently in other embodiments.

It is contemplated that, in some embodiments, part or the entirety of the central passenger seat 28 may be similarly moved between seating and stowed positions.

Figure 26:
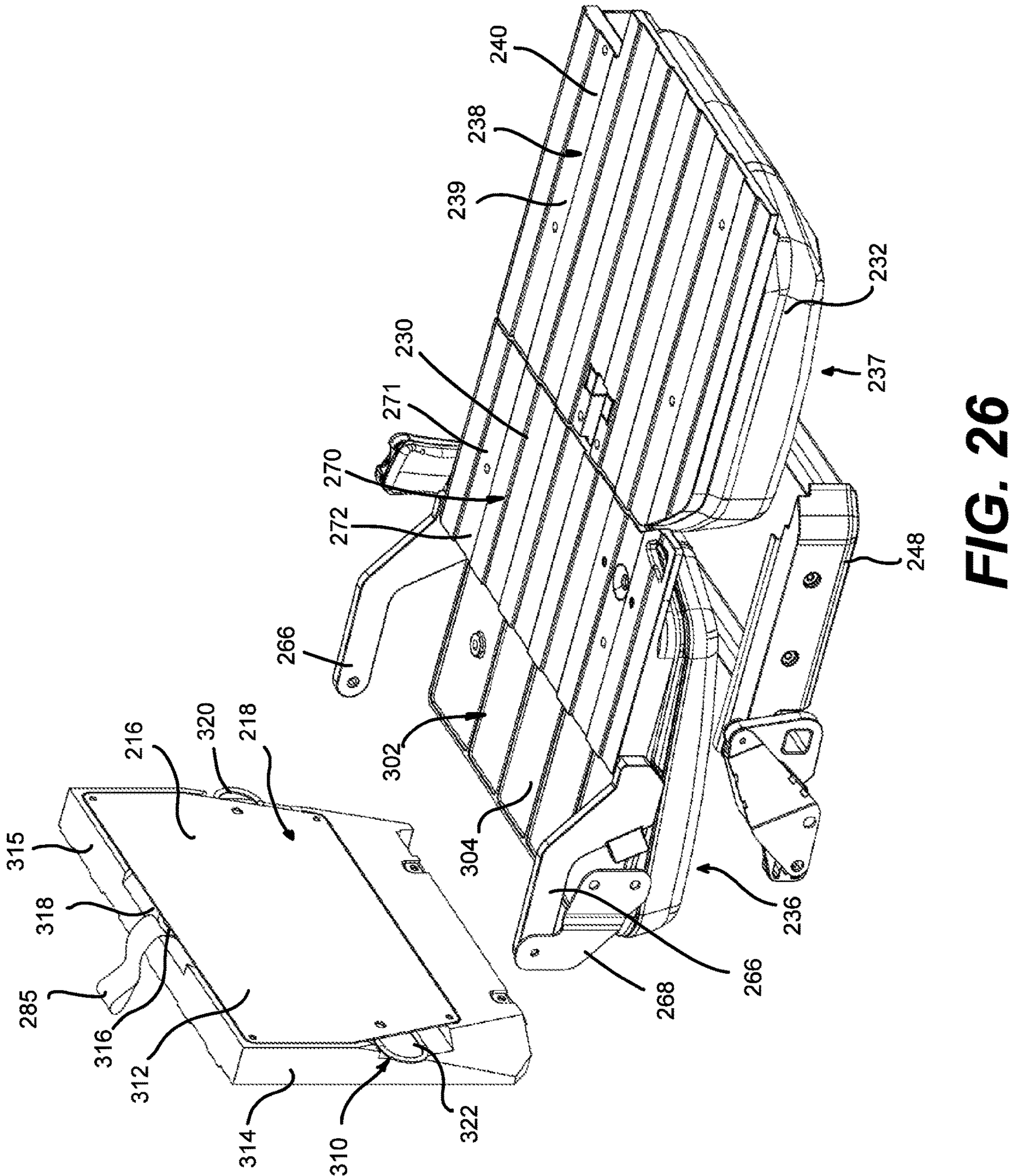
FIG. 26 is a perspective view taken from a top, front, right side of the passenger seat and a movable portion of the front wall of the cargo bed of the vehicle of FIG. 1, showing the passenger seat in the stowed position and the movable portion in an upright position thereof.
Figure 27:
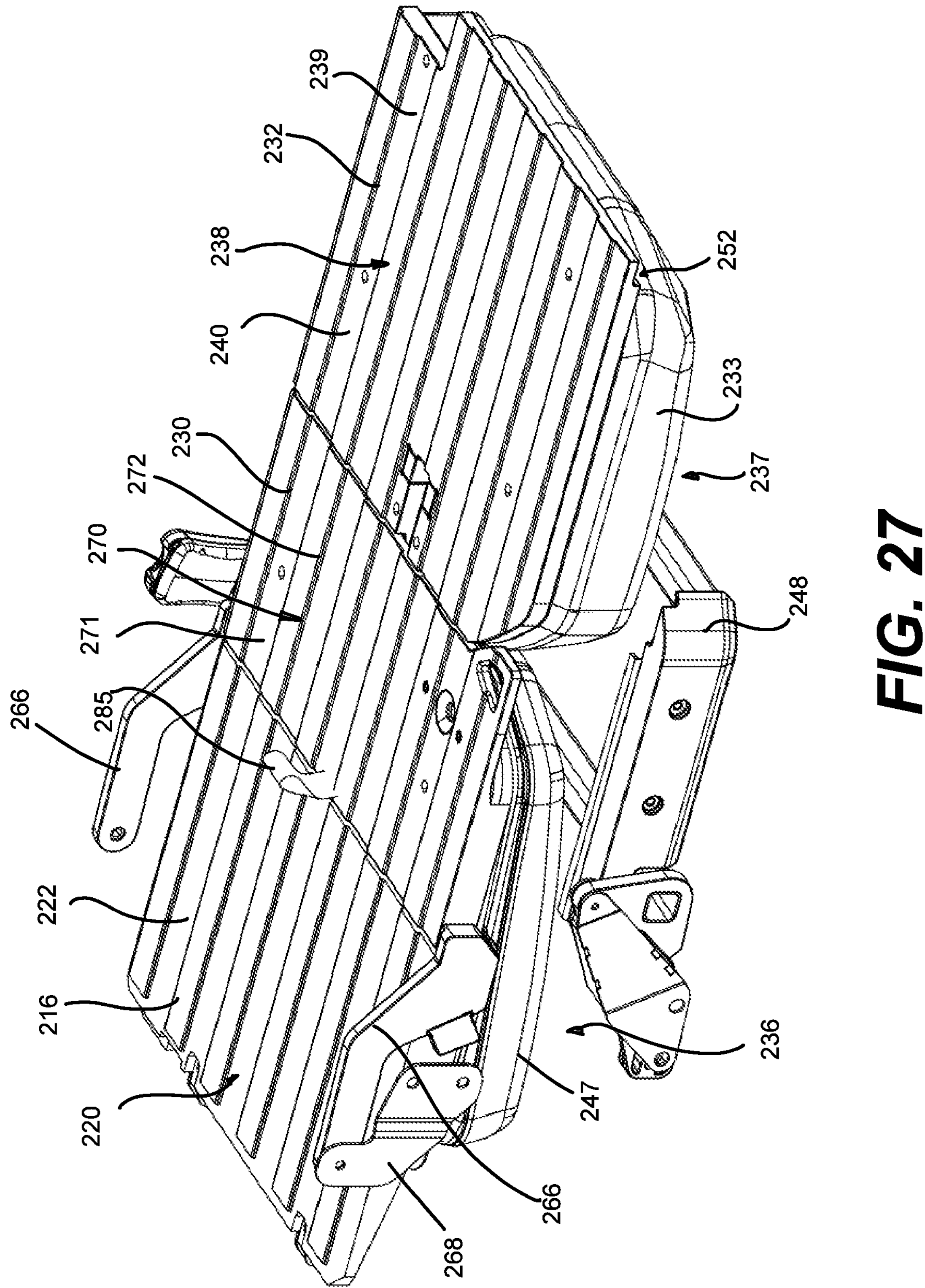
FIG. 27 is a perspective view taken from a top, front, right side of the passenger seat and the movable portion of FIG. 26, showing the passenger seat in the stowed position and the movable portion in a lowered position thereof.

In this embodiment, once the passenger seat 26 is in the stowed position, the user then moves the movable portion 216 of the front wall 102 of the cargo bed 100 from the upright position (shown in isolation from the remainder of the front wall 102 in FIG. 26) to the lowered position (FIG. 27) in order to uncover the pass-through opening 214. With reference to FIGS. 26 and 27, in this embodiment, in the lowered position of the movable portion 216, the movable portion 216 is received in a recess 302 defined by the rigid backing 271 on the posterior side 270 of the backrest 230. In particular, the recess 302 is defined in part by a recessed surface 304 of the rigid backing 271 that faces toward a same direction as the supporting surface 272 is offset therefrom.

In the lowered position of the movable portion 216, the rear surface 222 thereof faces upwardly and is vertically aligned with the cargo bed supporting surface 212 such that the rear surface 222 can support the items stored in the cargo bed 100 and extending into the cockpit area 22 via the pass-through opening 214. The rear surface 222 may thus also be referred to as a supporting surface 222. As shown in FIGS. 27 to 29, in the lowered position of the movable portion 216 and the stowed position of the passenger seat 26, the supporting surface 222 is generally vertically aligned with the supporting surfaces 240, 272 of the passenger seat 26 and also with the bottom surface 212 of the extension receptacle 202 and the cargo bed supporting surface 112 of the cargo bed 100. As such, in the lowered position of the movable portion 216 and the stowed position of the passenger seat 26, the supporting surface 222 of the movable portion 216 and the supporting surfaces 240, 272 of the passenger seat 26 form a generally continuous surface together with the bottom surface 212 of the extension receptacle 202 and the cargo bed supporting surface 112. It is to be understood that small negligible gaps may still be defined in a generally continuous surface which might let particles therethrough. Furthermore, when, additionally, the tailgate 108 is in the open position, the tailgate supporting surface 175, the cargo bed supporting surface 112, the supporting surfaces 240, 272 of the passenger seat 26 and the bottom surface 212 of the extension receptacle 202 form a generally continuous surface.

Figure 30:
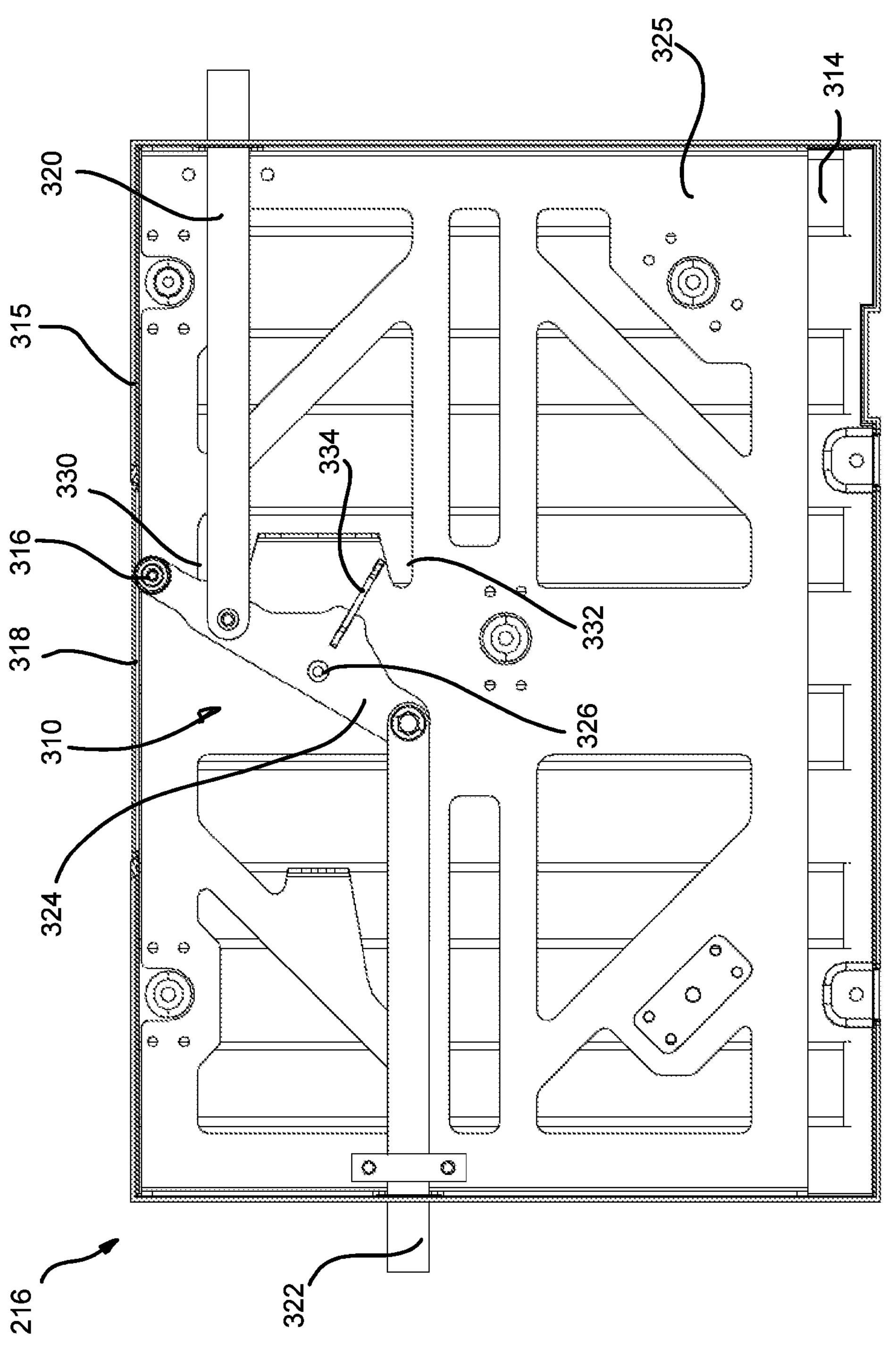
FIG. 30 is a front elevation view of the movable portion of the front wall of the cargo bed, shown with part of the movable portion removed to expose a lock of the movable portion.

With reference to FIGS. 26 and 30, in this embodiment, the movable portion 216 has a lock 310 that selectively locks the movable portion 216 in the upright position. In this embodiment, the lock 310 is partially received between a front cover 312 (FIG. 26) of the movable portion 216 and a body 314 of the movable portion 216 which defines the supporting surface 222 on the rear side 220. In this embodiment, the lock 310 has a handle 316 disposed at an upper end 315 of the movable portion 216 and accessible via a slot 318 defined between the body 314 and the front cover 312 at the upper end 315. The handle 316 is operatively connected to left and right locking members 320, 322 to cause selectively cause the locking members 320, 322 to extend or retract from the left and right sides of the movable portion 216 respectively. In particular, with reference to FIG. 30 in which the front cover 312 is removed to expose other components of the lock 310, the lock 310 has a rocking link 324 that is pivotably connected to a supporting plate 325 about a pivot 326. The rocking link 324 is also pivotably connected to the left locking member 320 and the right locking member 322 at points on opposite sides of the pivot 326. By actuating the handle 316, the user can selectively place the lock 310 in a locking position (illustrated in FIG. 30) in which portions of the left and right locking members 320, 322 extend past the body 314 sufficiently to engage respective openings (not shown) of the cargo bed 100 to secure the movable portion 216 in the upright position. In particular, in this example, respective openings are defined by the right wall 106 and a static portion of the front wall 102 to receive the left and right locking members 320, 322. In order to unlock the movable portion 216, the handle 316 is pivoted about the pivot 326 toward an opposite lateral side of the movable portion 216, thereby retracting the locking members 320, 322 inwardly causing them to disengage the openings of the cargo bed 100 that receive the locking members 320, 322 in the locking position of the lock 310. As shown in FIG. 30, the lock 310 also has upper and lower limiters 330, 332 that engage a limit member 334 connected to the rocking link 324 in order to limit the movement of the handle 316.

It is contemplated that the lock 310 could be configured differently in other embodiments.

Figure 31:
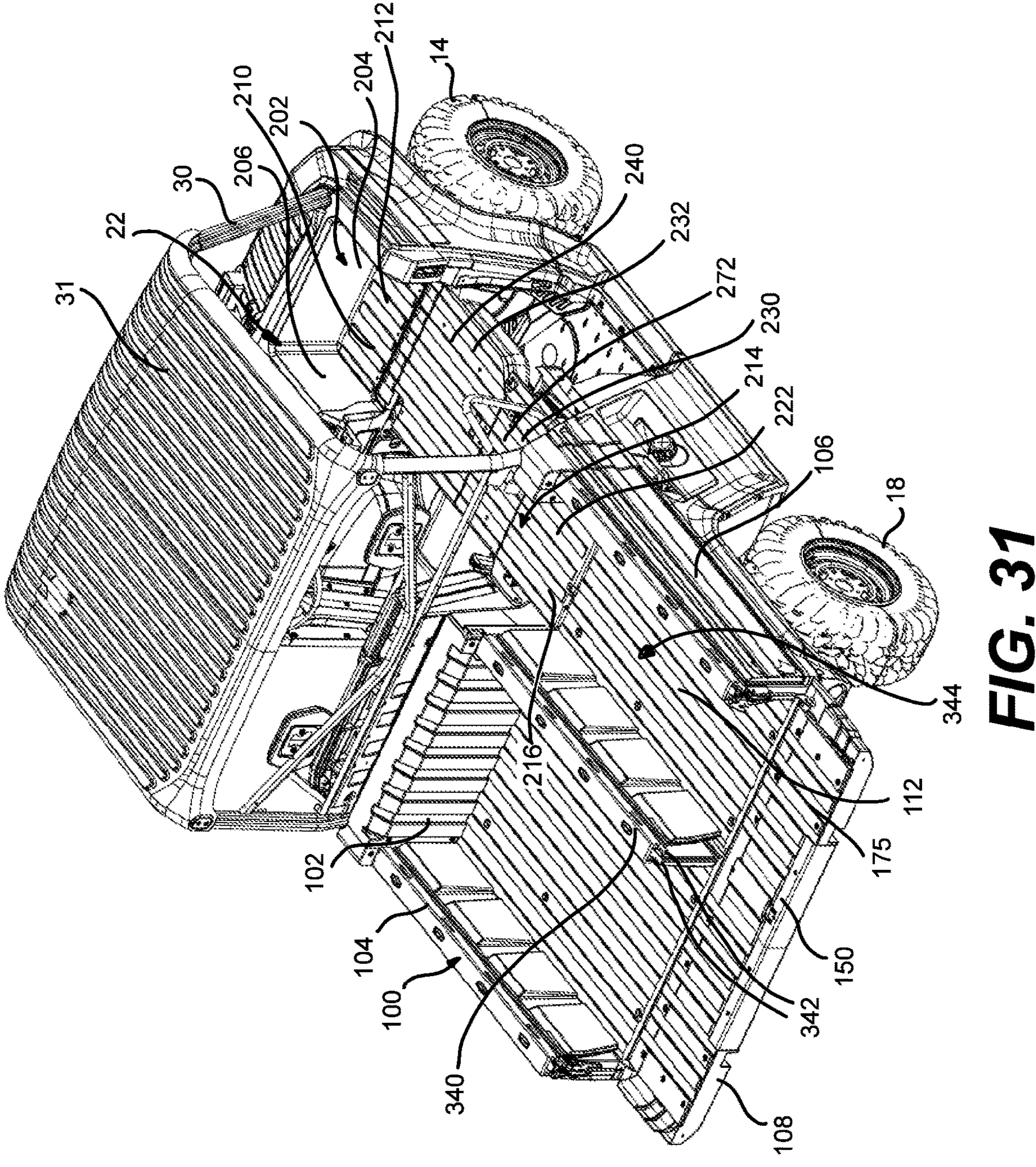
FIG. 31 is a perspective view taken from a top, rear, right side of the vehicle of FIG. 1, shown with a removable wall connected to the cargo bed.

With reference to FIG. 31, in this embodiment, the cargo bed 100 also has the removable wall 340 to define a sub-compartment 344 of the internal space 105 that is laterally aligned with the pass-through opening 214 (and therefore with the extension receptacle 202). Notably, the removable wall 340 extends longitudinally to divide the internal space 105 of the cargo bed 100 and thereby define the sub-compartment 344 between the removable wall 340 and the right wall 106 of the cargo bed 100. In embodiments in which the pass-through opening 214 is on the left side of the vehicle 10 (e.g., if the driver seat 24 is on the right side), the sub-compartment 344 could be defined between the left wall 104 and the removable wall 340. As will be appreciated, the sub-compartment 344 is in communication with the cockpit area 22 and thereby with the extension receptacle 202 via the pass-through opening 214. Therefore, the sub-compartment 344 can be designated to accommodate lengthy items. In this example, the removable wall 340 is received in part by a recess 275 (FIG. 29) defined by the cargo bed supporting surface 112 and engages the front wall 102 and the tailgate 108 (in its closed position) via front and rear hooks 342 (only the rear hooks 342 being shown in FIG. 31).

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a vehicle frame;
a plurality of ground-engaging members connected to the vehicle frame;
a motor supported by the vehicle frame, the motor being operatively connected to at least one of the ground-engaging members;
a cargo bed connected to the vehicle frame, the cargo bed comprising:
a cargo bed frame,
a body connected to the cargo bed frame, and
a tailgate extending laterally at a rear end of the cargo bed; and
at least one first support holder and at least one second support holder disposed below the cargo bed, each of the at least one first support holder and each of the at least one second support holder defining at least in part an opening for inserting a first elongate support and a second elongate support therethrough respectively, the at least one first support holder and the at least one second support holder being oriented such that the first and second elongate supports are inserted from a common side of the cargo bed into the openings of the at least one first support holder and the at least one second support holder,
the opening of each of the at least one first support holder and of each of the at least one second support holder being shaped to match a cross-sectional profile of a corresponding one of the first and second elongate supports such that, in use, the at least one first support holder and the at least one second support holder at least partially surround part of the first and second elongate supports respectively to hold the first and second elongate supports in place.

2. The vehicle of claim 1, wherein, for each support holder of the at least one first support holder and the at least one second support holder, the opening defined at least in part by the support holder is generally rectangular.

3. The vehicle of claim 1, wherein, for each opening:
one of a width and a height of the opening is approximately 1.5 inches;
another one of the width and the height of the opening is approximately 3.5 inches;
the width is measured laterally; and
the height is measured vertically.

4. The vehicle of claim 1, wherein each of the at least one first support holder and each of the at least one second support holder is a metallic bracket.

5. The vehicle of claim 1, wherein:
the at least one first support holder is at least one left support holder;
the at least one second support holder is at least one right support holder laterally spaced from the at least one left support holder; and
the at least one left support holder and the at least one right support holder are oriented such that, in use, the first and second elongate supports are inserted longitudinally from a rear side of the cargo bed into the openings of the at least one first support holder and the at least one second support holder.

6. The vehicle of claim 5, wherein:

the cargo bed comprises a tailgate having an outer surface and an inner surface opposite the outer surface, the tailgate being movable from an open position to a closed position;

the outer surface defines a left recess and a right recess, the left recess being laterally aligned with the at least one left support holder, the right recess being laterally aligned with the at least one right support holder; and the left and right recesses are configured to respectively receive at least in part the first and second elongate supports therein in the open position of the tailgate.

7. The vehicle of claim 1, wherein a ratio of a distance between the at least one first support holder and the at least one second support holder over a width of the cargo bed is between 0.7 and 1 inclusively.

8. The vehicle of claim 1, wherein:

the body comprises a front wall, a left wall and a right wall defining in part an internal space of the cargo bed; and the at least one first support holder and the at least one second support holder are fastened to at least one of the vehicle frame, the cargo bed frame, and the body of the cargo bed.

9. The vehicle of claim 1, wherein:

the plurality of ground-engaging members includes left ground-engaging members and right ground-engaging members; and the at least one first support holder and the at least one second support holder are disposed laterally between the left and right ground-engaging members.

10. The vehicle of claim 1, wherein the at least one first support holder and the at least one second support holder are disposed opposite sides of a longitudinal centerplane of the vehicle.

11. A vehicle comprising:

a frame;

a plurality of ground-engaging members connected to the frame;

a motor supported by the frame, the motor being operatively connected to at least one of the ground-engaging members;

a cargo bed connected to the frame; and at least one left support holder and at least one right support holder disposed below the cargo bed, the at least one right support holder being laterally spaced from the at least one left support holder, each of the at least one left support holder and each of the at least one right support holder defining at least in part an opening for inserting a first elongate support and a second elongate support therethrough respectively, the at least one left support holder and the at least one right support holder being oriented such that, in use, the first and second elongate supports are inserted longitudinally from a rear side of the cargo bed into the openings of the at least one left support holder and the at least one right support holder, the opening of each of the at least one left support holder and of each of the at least one right support holder being shaped to match a cross-sectional profile of a corresponding one of the first and second elongate supports such that, in use, the at least one left support holder and the at least one right support holder at least partially surround part of the first and second elongate supports respectively to hold the first and second elongate supports in place, the at least one left support holder includes a front left support holder and a rear left support holder longitudinally spaced from each other and laterally aligned with each other, the front left support holder and the rear left support holder being configured to receive the first elongate support; and the at least one right support holder includes a front right support holder and a rear right support holder longitudinally spaced from each other and laterally aligned with each other, the front right support holder and the rear right support holder being configured to receive the second elongate support.

12. The vehicle of claim 11, wherein a ratio of a distance between the front left support holder and the rear left support holder or between the front right support holder and the rear right support holder over a length of the cargo bed measured longitudinally is between 0.3 and 0.5 inclusively.

13. The vehicle of claim 1, wherein each of the at least one first support holder and each of the at least one second support holder has a length between approximately 2 and 4 inches inclusively.

14. The vehicle of claim 1, wherein the at least one first support holder and the at least one second support holder are oriented such that the first and second elongate supports are inserted generally parallel to each other into the openings of the at least one first support holder and the at least one second support holder.

15. A method for installing a workbench on a vehicle having a cargo bed, the cargo bed comprising: a cargo bed frame, a body connected to the cargo bed frame, and a tailgate extending laterally at a rear end of the cargo bed, the method comprising:

inserting a first elongate support through a first opening defined at least in part by a first support holder connected to the cargo bed and disposed below the cargo bed;

inserting a second elongate support, parallel to the first elongate support, through a second opening defined at least in part by a second support holder connected to the cargo bed and disposed below the cargo bed, the first elongate support and the second elongate support being sized to extend past the cargo bed; and installing a work surface on a portion of the first elongate support and the second elongate support that extends past the cargo bed.

16. The method of claim 15, wherein:

the first support holder is a left support holder;

the second support holder is a right support holder;

the cargo bed comprises a tailgate that is movable between an open position and a closed position, the tailgate having an outer surface and an inner surface opposite the outer surface;

the outer surface defines a left recess and a right recess laterally aligned with the left and right support holders respectively; and the method further comprises:

opening the tailgate to receive part of the first elongate support in the left recess of the tailgate and to receive part of the second elongate support in the right recess of the tailgate.

17. The vehicle of claim 11, wherein:

the plurality of ground-engaging members includes a rear left wheel and rear right wheel;

the front left support holder is longitudinally aligned with the rear left wheel;

the rear left support holder is disposed rearward of the rear left wheel;

the front right support holder is longitudinally aligned with the rear right wheel; and the rear right support holder is disposed rearward of the rear right wheel.

18. A vehicle comprising:

a frame;

a plurality of ground-engaging members connected to the frame;

a motor supported by the frame, the motor being operatively connected to at least one of the ground-engaging members;

a cargo bed connected to the frame, the cargo bed comprises a tailgate extending laterally at a rear end of the cargo bed, the tailgate moving between an open position and a closed position; and at least one first support holder and at least one second support holder disposed below the cargo bed, each of the at least one first support holder and each of the at least one second support holder defining at least in part an opening for inserting a first elongate support and a second elongate support therethrough respectively, the at least one first support holder and the at least one second support holder being oriented such that the first and second elongate supports are inserted from a common side of the cargo bed into the openings of the at least one first support holder and the at least one second support holder, the opening of each of the at least one first support holder and of each of the at least one second support holder being shaped to match a cross-sectional profile of a corresponding one of the first and second elongate supports such that, in use, the at least one first support holder and the at least one second support holder at least partially surround part of the first and second elongate supports respectively to hold the first and second elongate supports in place.

19. The vehicle of claim 18, wherein the tailgate is configured to move relative to the at least one first support holder and the at least one second support holder between the open position and the closed position with the first elongate support inserted in the at least one first support holder and the second elongate support holder inserted in the at least one second support holder.

20. The vehicle of claim 19, wherein, in the open position, the tailgate extends over the first elongate support and the second elongate support.

* * * * *